(12) United States Patent
McFadyen et al.

(10) Patent No.: US 12,553,969 B2
(45) Date of Patent: Feb. 17, 2026

(54) MAGNET SYSTEM FOR NUCLEAR MAGNETIC RESONANCE

(71) Applicant: Synex Medical Inc., Toronto (CA)

(72) Inventors: Stephen McFadyen, Toronto (CA); Benjamin Saul Nashman, Toronto (CA); Kyle Clocker, Boston, MA (US); Mohammad Reza Fazlali, Toronto (CA)

(73) Assignee: Synex Medical Inc., Toronto (CA)

( * ) Notice: Subject to any disclaimer, the term of this patent is extended or adjusted under 35 U.S.C. 154(b) by 0 days.

(21) Appl. No.: 19/277,009

(22) Filed: Jul. 22, 2025

(65) Prior Publication Data

US 2026/0023141 A1    Jan. 22, 2026

Related U.S. Application Data

(60) Provisional application No. 63/674,190, filed on Jul. 22, 2024.

(51) Int. Cl.
| | | |
|---|---|---|
| *A61B 5/055* | (2006.01) | |
| *A61B 5/00* | (2006.01) | |
| *A61B 5/145* | (2006.01) | |
| *G01R 33/341* | (2006.01) | |
| *G01R 33/383* | (2006.01) | |
| *G01R 33/421* | (2006.01) | |

(52) U.S. Cl.
CPC ............ *G01R 33/383* (2013.01); *A61B 5/055* (2013.01); *A61B 5/14532* (2013.01); *A61B 5/70* (2013.01); *G01R 33/341* (2013.01); *G01R 33/4215* (2013.01)

(58) Field of Classification Search
CPC ....... A61B 5/055; A61B 5/14532; A61B 5/70; G01R 33/341; G01R 33/4215; G01R 33/383
See application file for complete search history.

(56) References Cited

U.S. PATENT DOCUMENTS

| | | | |
|---|---|---|---|
| 4,875,486 A | 10/1989 | Rapoport et al. | |
| 5,072,732 A | 12/1991 | Rapoport et al. | |
| 5,148,138 A * | 9/1992 | Miyata | H01F 7/0278 335/302 |
| 5,729,141 A * | 3/1998 | Hass | G01R 33/385 324/318 |

(Continued)

FOREIGN PATENT DOCUMENTS

CN    112068055 B  *  6/2022  ......... G01R 33/3802

OTHER PUBLICATIONS

"Direct Non-Invasive Measurement of Glucose with Tabletop Magnetic Resonance Spectroscopy", Synex Medical, Oct. 10, 2023.

(Continued)

*Primary Examiner* — Mark D Remaly
(74) *Attorney, Agent, or Firm* — Jeffrey Schox; Annabel Imbrie-Moore

(57) ABSTRACT

The system can include: an array of magnets. In variants, the system can function to generate a homogenous magnetic field within a sample (e.g., in the pulp of a finger). In an example, the system can be used for nuclear magnetic resonance (NMR) imaging and/or magnetic resonance imaging (MRI). In a specific example, the system can be used to measure blood analyte levels (e.g., glucose levels) within a sample.

12 Claims, 22 Drawing Sheets

(56) References Cited

U.S. PATENT DOCUMENTS

| | | |
|---|---|---|
| 6,255,929 B1 | 7/2001 | Xu et al. |
| 7,405,567 B2 | 7/2008 | Mcdowell |
| 9,285,441 B1 | 3/2016 | Mcdowell |
| 10,739,428 B2 | 8/2020 | Mcdowell |
| 10,845,441 B1 | 11/2020 | Mcdowell |
| 11,204,405 B1 | 12/2021 | Mcdowell |
| 11,237,237 B2 | 2/2022 | O'brien |
| 12,245,849 B2 | 3/2025 | Nashman et al. |
| 2010/0201357 A1 | 8/2010 | Ogawa et al. |
| 2013/0154642 A1 | 6/2013 | Sueoka |
| 2016/0011290 A1 | 1/2016 | Iannello |
| 2016/0120438 A1 | 5/2016 | Cima et al. |
| 2017/0299674 A1 | 10/2017 | Mcdowell |
| 2017/0325710 A1 | 11/2017 | Ryan et al. |
| 2018/0106876 A1 | 4/2018 | Nielsen et al. |
| 2019/0271749 A1 | 9/2019 | Cistola et al. |
| 2021/0121108 A1 | 4/2021 | Nashman et al. |
| 2021/0199736 A1 | 7/2021 | O'brien |
| 2021/0290319 A1 | 9/2021 | Poltaretskyi et al. |

OTHER PUBLICATIONS

"NMR Topic of the Month: The Perfect Echo Pulse Sequence", Texas A&M, https://nmr.chem.tamu.edu/pdf/tidbits/NMRTotM_202208.pdf, Aug. 2022.

"Solving the Holy Grail of Health Monitoring", Synex Medical, https://synex.substack.com/p/188746f5-066b-4f9f-a645-7a2a8ba53ee3, Nov. 9, 2023.

Ahmed, et al., "Robustness of dynamical decoupling sequences", arXiv:1211.5001v2, https://arxiv.org/pdf/1211.5001, Mar. 26, 2013.

Tewari, et al., "The permanent magnet hypothesis: an intuitive approach to designing non-circular magnet arrays with high field homogeneity", Sci Rep 13, 2774 (2023). https://doi.org/10.1038/s41598-023-29533-9.

\* cited by examiner

MAGNET SYSTEM FOR NUCLEAR MAGNETIC RESONANCE

CROSS-REFERENCE TO RELATED APPLICATIONS

This application claims the benefit of U.S. Provisional Application No. 63/674,190 filed 22 Jul. 2024, which is incorporated in its entirety by this reference.

TECHNICAL FIELD

This invention relates generally to the nuclear magnetic resonance field, and more specifically to a new and useful system and method in the nuclear magnetic resonance field.

DETAILED DESCRIPTION

The following description of the embodiments of the invention is not intended to limit the invention to these embodiments, but rather to enable any person skilled in the art to make and use this invention.

1. Overview

Figure 1:
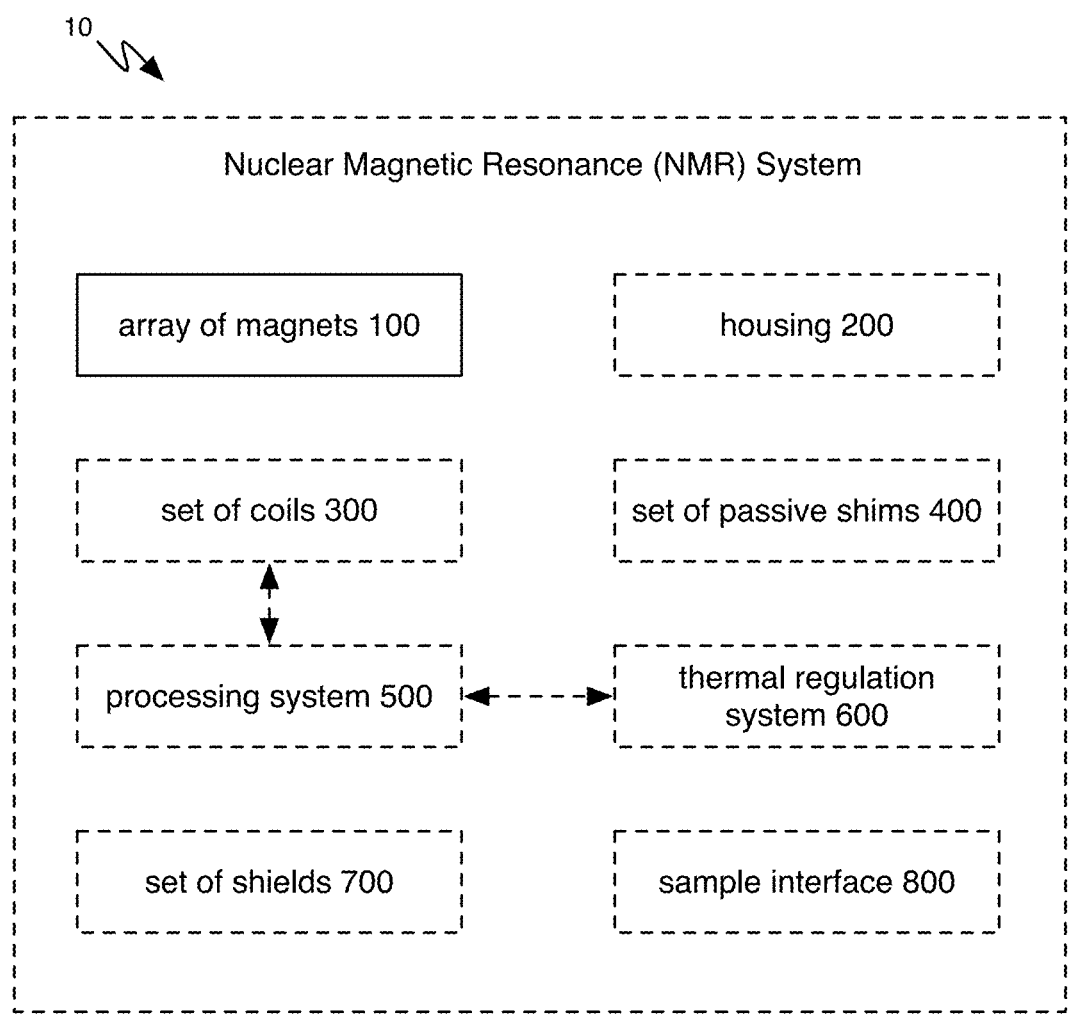
FIG. 1 is a schematic representation of a variant of the system.

As shown in FIG. 1, the system 10 can include: an array of magnets 100. However, the system 10 can additionally or alternatively include any other suitable elements.

In variants, the system 10 can function to generate a homogenous magnetic field within a target region of a sample (e.g., in the pulp of a finger). In an example, the system 10 can be used for nuclear magnetic resonance (NMR) imaging and/or magnetic resonance imaging (MRI). In a specific example, the system 10 can be used to measure blood analyte levels (e.g., glucose levels) within a sample (e.g., a finger).

2. Examples

In an example, the system can include an array of magnets arranged around a bore. A sample (e.g., finger) can optionally be positioned offset within the bore during a nuclear magnetic resonance (NMR) scan (e.g., a measurement acquisition). In an illustrative example, when the sample is a finger, the sample can be offset such that a target region of the finger (e.g., the pulp of the finger) intersects with the longitudinal axis of the bore. In a specific example, a cross-section of the bore (e.g., in a plane orthogonal to the longitudinal axis of the bore) is oblong, with a first dimension (e.g., the major axis, in the case of an elliptic bore) larger than a second dimension (e.g., the minor axis, in the case of an elliptic bore). The array of magnets can optionally be segmented into multiple stacked magnet array segments (e.g., rings), where each magnet array segment includes a set of magnets arranged accurately around the bore. In a specific example, the array of magnets can have a barbell shape, with one or more magnet array segments at each end of the bore having larger outer dimension(s) (e.g., width, height, etc.) than one or more magnet array segments in the middle of the bore. In another specific example, each magnet array segment includes magnets from multiple shape classes (e.g., a subset of magnets that are trapezoidal prisms and a subset of magnets that are rectangular prisms). In an illustrative example, each magnet array segment can include a first set of magnets from a first shape class (e.g., trapezoidal prism shape class) and a second set of magnets from a second shape class (e.g., rectangular prism shape class) arranged in an alternating pattern around the bore. In another specific example, a subset of magnets (e.g., the rectangular prism magnets) can be moved radially inward or outward (e.g., during assembly) to increase homogeneity of the magnetic field in a region of interest of the sample.

3. Technical Advantages

Variants of the technology can confer one or more advantages over conventional technologies.

Conventional methods of NMR testing of a human appendage require large, heavy NMR systems to maintain magnetic field homogeneity over a given region of interest (ROI). Scaling these conventional NMR systems down in size (e.g., to less than 1,000 cm$^3$ volume, to less than 5 kg weight, etc.) would result in an ROI that is too small for accurate biometric parameter measurements due to their high ratio of overall volume to ROI volume. Additionally, small manufacturing errors compound as NMR systems decrease in size, resulting in a significant decrease in magnetic field homogeneity and thus a decrease in measurement sensitivity.

Variants of the technology can reduce the size and weight of an NMR biometric measurement system while maintaining high measurement sensitivity for analytes in a target region of a sample (e.g., the pulp of the finger). In a first example, the system can implement an array of magnets arranged arcuately around a bore, where the bore has an oblong cross-section (e.g., the cross-section approximates an ellipse, a rounded rectangle, etc.). In a specific example, this magnet arrangement can result in an ROI tailored for a slab-shaped target region of a sample (e.g., the ROI is a rectangular prism, a rounded rectangular prism, etc.). In an illustrative example, this magnet arrangement can provide particular advantages when the sample (finger) is offset within the bore (e.g., where this magnet arrangement can ensure that the ROI is entirely or predominantly within the offset sample). In a second example, a subset of magnets in the system can be moved radially inward or outward to increase homogeneity of the magnetic field in the ROI. In a third example, a subset of magnets in the system can have substantially identical dimensions, such that the magnets can be rearranged (e.g., swapped) based on respective magnetic field measurements to increase homogeneity of the magnetic field in the ROI.

However, further advantages can be provided by the system and method disclosed herein.

4. System

As shown in FIG. 1, the system 10 (e.g., a nuclear magnetic resonance system) can include: an array of magnets 100. The system 10 can optionally include: a housing 200, a set of coils 300, a set of passive shims 400, a processing system 500, a thermal regulation system 600, a set of shields 700, a sample interface 800, a user device, a user interface, and/or any other suitable components.

The system 10 can optionally include and/or use systems and methods disclosed in U.S. application Ser. No. 19/045,936, filed 2 Feb. 2025, and/or U.S. application Ser. No. 18/798,176, filed 8 Aug. 2024, each of which is incorporated in its entirety by this reference.

As used herein, the y-axis is defined as aligning with the longitudinal axis of a bore defined by the array of magnets 100 (e.g., where the array of magnets 100 are arranged arcuately around the bore, defining all or a portion of the boundary of the bore). The coordinates, as used herein, are intended only as a reference and are not intended to restrict the orientation of the system 10 relative to a global coordinate system. The system 10 can be arranged in any orientation (e.g., where the x-axis corresponds to a vertical axis, where the y-axis corresponds to a vertical axis, where the z-axis corresponds to a vertical orientation, etc.).

The system 10 can be used with one or more samples. In an example, the system 10 can create a magnetic field in a target region (e.g., target volume) of a sample. In a specific example, the system 10 can be used to characterize analyte levels (e.g., concentration or other quantification of the analyte) in the sample. The sample 10 preferably includes a body region of a user, but can alternatively include any other in vivo sample, an in vitro sample, an inanimate sample (e.g., liquid reference sample, a phantom, etc.), and/or any other sample. The body region can include a digit (e.g., finger, toe, etc.), an extremity (e.g., arm, leg, wrist, etc.), any other appendage, and/or other body region. Examples of analytes in the sample include: glucose, methylsulfonylmethane (MSM), cholesterol, any blood metabolite, a proxy for an analyte (e.g., glucose proxy), and/or any other component. In a specific example, the system 10 can be used to determine a concentration of a blood analyte (e.g., glucose) in a finger.

The array of magnets 100 can function to generate a magnetic field for nuclear magnetic resonance (NMR) scans. In specific examples, the array of magnets 100 can function to generate a magnetic field for NMR spectroscopy and/or magnetic resonance imaging (MRI) measurements of the sample. The array of magnets 100 can optionally include one or more magnets arranged around a bore (e.g., where the array of magnets 100 defines the bore). In a specific example, the array of magnets 100 (e.g., a face of each magnet in the array of magnets 100) defines all or a portion of the boundary of the bore. The sample can optionally be positioned within the bore during an NMR scan (e.g., during measurement acquisition).

The array of magnets 100 can include one or more magnets (e.g., at least 6, at least 12, at least 24, at least 48, at least 100, at least 112, any range or value therebetween, etc.). The array of magnets 100 preferably includes permanent magnets, but can additionally or alternatively include temporary magnets. The material of each magnet in the array of magnets 100 can be iron, cobalt, nickel, neodymium, alloys thereof, and/or any other material.

Figure 2A:
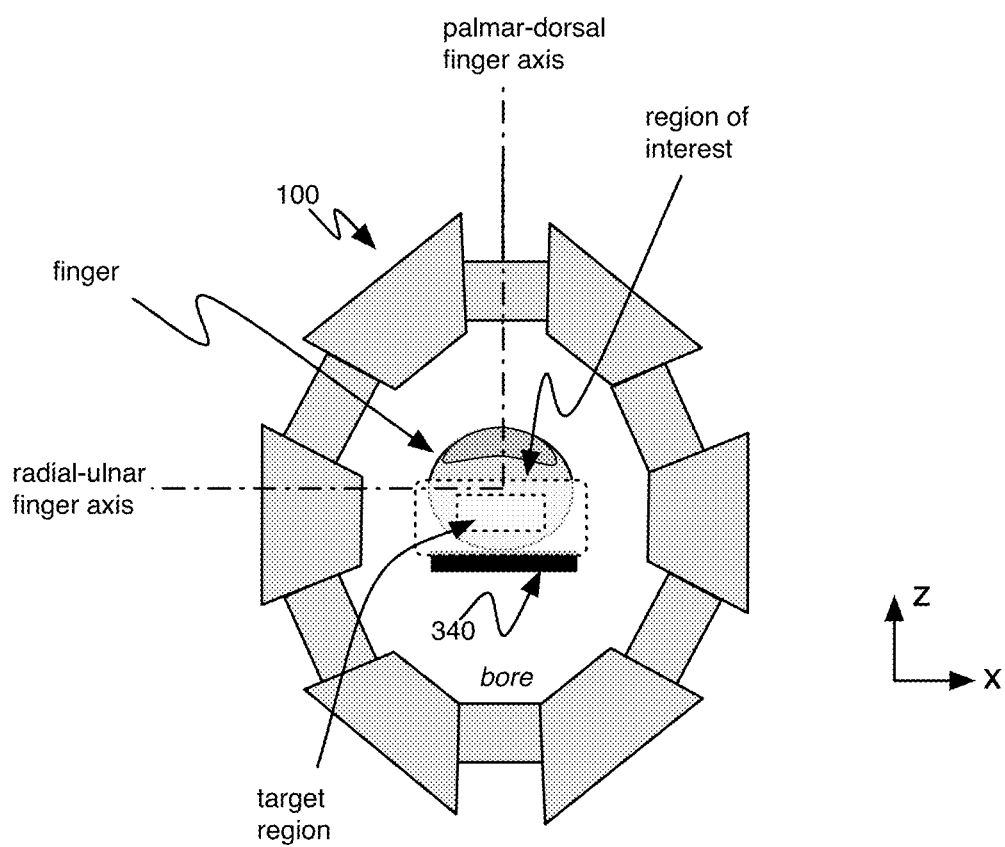
FIGS. 2A and 2B are cross-sectional views of an example of the system, illustrating a region of interest (ROI) within the bore and a target region within the sample (e.g., a finger).
Figure 2B:
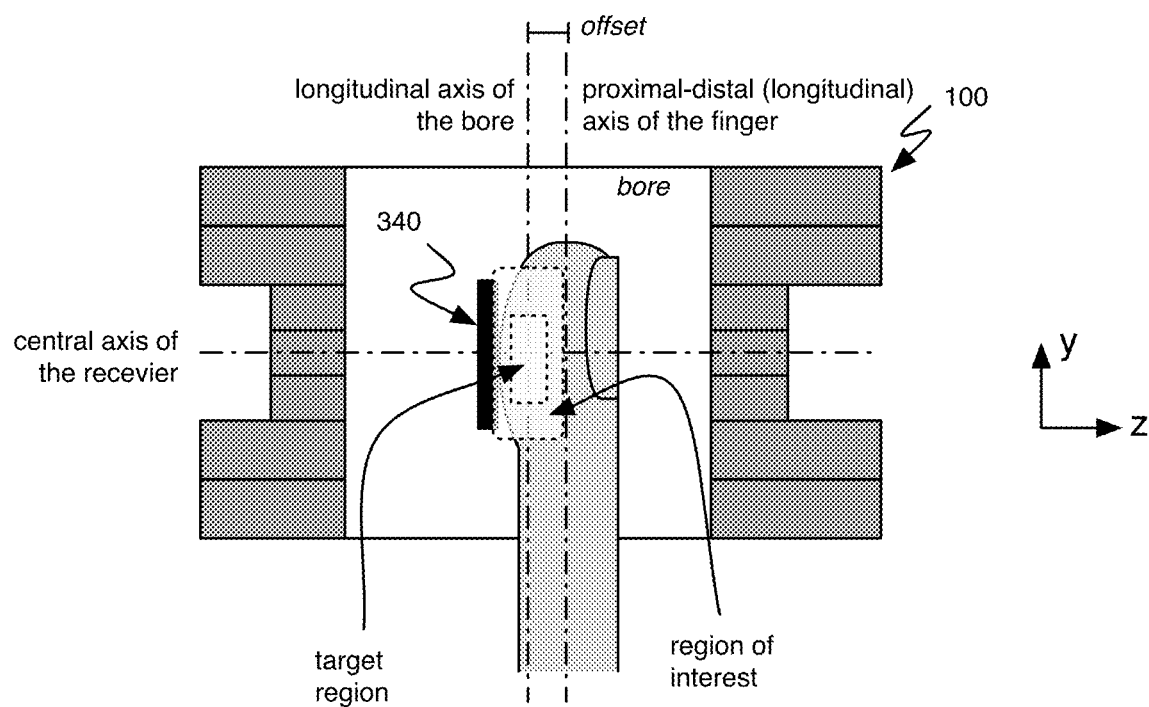

The array of magnets 100 can optionally apply a magnetic field over a region of interest (ROI). Examples are shown in FIG. 2A and FIG. 2B. The ROI is preferably within the bore (e.g., entirely within the bore), but can alternatively partially overlap with the bore and/or be otherwise positioned. The ROI is preferably nonspherical, but can alternatively be a sphere. In an example, the ROI can be a rectangular prism (e.g., a slab), a rounded rectangular prism, an oblate spheroid, and/or any other shape. In a specific example, the width of the ROI (e.g., width along the x-axis, where the longitudinal axis of the bore is the y-axis) can be between 0.5 mm-100 mm or any range or value therebetween (e.g., 5 mm-20 mm, approximately 10 mm, etc.). In a specific example, the height of the ROI (e.g., height along the z-axis, where the longitudinal axis of the bore is the y-axis) can be between 0.25 mm-50 mm or any range or value therebetween (e.g., 1 mm-10 mm, approximately 5 mm, etc.). In a specific example, the length of the ROI (e.g., length along the y-axis, where the longitudinal axis of the bore is the y-axis) can be between 1 mm-100 mm or any range or value therebetween (e.g., etc. 5 mm-50 mm, 10 mm-20 mm, approximately 15 mm, etc.). The height of the ROI is preferably less than the width and/or the length, but can alternatively be equal to or greater than the width and/or the length. The width of the ROI is preferably substantially similar to the length, but can alternatively be substantially different. In a specific example, the ROI volume can be between 0.5 mm$^3$-50 cm$^3$ or any range or value therebetween (e.g., 2 mm$^3$-5 cm$^3$, 500 mm$^3$-1000 mm$^3$, 50 mm$^3$-2 cm$^3$, etc.).

The ROI preferably overlaps (e.g., fully overlaps) with a target region of the sample, but can alternatively be otherwise configured relative to a sample. Examples are shown in FIG. 2A and FIG. 2B. For example, the target region can be within the ROI. The target region (e.g., volume of interest) can be a slice, a column, a voxel, and/or any other volume of interest. In a specific example, a width of the target region (e.g., in the x-direction, along a radial-ulnar axis of the finger when the finger is positioned within the bore for measurement acquisition, etc.) can be between 0.1 mm-20 mm or any range or value therebetween (e.g., 5 mm-15 mm, 5 mm, 8 mm, 10 mm, 12 mm, 15 mm, greater than 2 mm, greater than 5 mm, greater than 10 mm, less than 10 mm, etc.). In a specific example, a height of the target region (e.g., along the z-axis; along a dorsal-palmar axis of the finger when the finger is positioned within the bore for measurement acquisition) can be between o.1 mm-15 mm or any range or value therebetween (e.g., 0.5 mm-4 mm, 2 mm-3 mm, 1 mm, 2 mm, 3 mm, 4 mm, 5 mm, less than 5 mm, less than 10 mm, less than 15 mm, etc.). In a specific example, a length of the target region (e.g., in the y-direction; when the finger is positioned within the bore for measurement acquisition: along a proximal-distal axis of the finger, along a longitudinal axis of the finger, along a longitudinal axis of the bore, etc.) can be between 0.1 mm-20 mm or any range or value therebetween (e.g., 5 mm-15 mm, 5 mm, 8 mm, 10 mm, 12 mm, 15 mm, greater than 2 mm, greater than 5 mm, greater than 10 mm, less than 10 mm, etc.).

In a specific example, the height of the target region is less than the width of the target region. In a specific example, the height of the target region (e.g., along a dorsal-palmar axis of the finger) is less than the length of the target region (e.g., along a proximal-distal axis of the finger). In a specific example, the target region of the finger is a voxel (e.g., where the set of gradient coils 360 includes three gradient coils corresponding to three directions), wherein a height of the voxel along a dorsal-palmar axis of the finger is less than a width of the voxel along a radial-ulnar axis of the finger and is less than a length of the voxel along a proximal-distal axis of the finger. In a specific example, a volume of the target region can be between 0.001 mL-100 mL or any range or value therebetween.

In specific examples, the target region can include (e.g., be located within and/or overlap with): the pulp of a finger (e.g., including tissue from the periosteum of the distal phalanx to the epidermis), the fingertip pad, the dermis of a finger, the hypodermis of a finger, the fingertip, and/or any other region of the finger. In a specific example, for a finger sample, the target region is preferably between 0 mm-10 mm (e.g., 0.05 mm-5 mm, less than 10 mm, less than 7 mm, less than 5 mm, less than 2 mm, greater than 0.5 mm, greater than 1 mm, any range or value therebetween, etc.) from the pulp surface (within the pulp, from the fingertip pad surface). In another specific example, for a finger sample, the target region is preferably between 0.05 mm-10 mm (e.g., any range or value therebetween, 0.1 mm-5 mm, greater than 0.1 mm, greater than 0.5 mm, greater than 1 mm, etc.) from the distal phalanx.

In a specific example, the field strength of the magnetic field within the ROI can be between 0.05 Tesla-2 Tesla or any range or value therebetween (e.g., 0.1 Tesla-1 Tesla, 0.25 Tesla-0.75 Tesla, 0.5 Tesla, 0.6 Tesla, less than 1 Tesla, less than 0.75 Tesla, etc.). In a specific example, the uniformity of the magnetic field within the ROI can be less than: 3000 ppm, 2000 ppm, 1500 ppm, 1200 ppm, 1000 ppm, 500 ppm, and/or any other base uniformity value such that one or more shimming systems and/or methods can correct the final uniformity of the magnetic field to below a threshold (e.g., 500 ppm, 100 ppm, 50 ppm, 10 ppm, 1 ppm, 0.5 ppm, etc.). Examples of shimming methods include: coarse shimming by adjusting the position of magnets in the array of magnets 100, shimming using the set of passive shims 400, active shimming using an active shim coil 380, and/or any other shimming method.

The array of magnets 100 can include one or more magnets arranged around a bore (e.g., arcuately around the bore). For example, the array of magnets 100 can define the bore. In a specific example, the array of magnets 100 (e.g., a face of each magnet in the array of magnets 100) defines all or a portion of the boundary (e.g., outer boundary) of the bore. In a specific example, the array of magnets 100 and/or a magnet array segment therein can form an annular array (e.g., magnets in the array of magnets 100 are arranged in an annular array), wherein an inner boundary of the annular array (e.g., formed by a face of each magnet in the magnet array) defines a boundary of the bore. As used herein, the term annular array can refer to any shape with genus 1 (e.g., containing a bore). In examples, the array of magnets 100 forms a cylindrical shell (e.g., annular cylinder), an elliptic cylindrical shell, a polyhedron with genus 1 (e.g., a polyhedron containing a bore), any shape with genus 1, and/or any other three-dimensional shape. In specific examples, the annular array can be a circular annular array (e.g., a cylindrical shell) or a noncircular annular array (e.g., an elliptic cylindrical shell, an oblong structure containing a bore, etc.). In an illustrative example, the array of magnets 100 can form an oblong annular array (e.g., each magnet array segment is arranged in an oblong annular array), wherein an inner boundary of the oblong annular array defines a boundary of an oblong bore.

A cross-section of the bore in a plane orthogonal to the longitudinal axis of the bore is preferably noncircular, but can alternatively be circular. For example, a cross-section of the bore in a plane orthogonal to the longitudinal axis of the bore can be or approximate an ellipse, a rounded rectangle (e.g., squircle), a polyhedron, any oblong shape (e.g., with its dimension in the z-direction greater than its dimension in the x-direction; wherein the longitudinal axis of the bore extends along the y-axis), and/or any other shape. In a specific example, the cross-section of the bore is oblong, wherein a width of the array of magnets along a first axis of the bore (e.g., along the x-axis) is less than a height of the array of magnets along a second axis of the bore (e.g., along the z-axis), the second axis orthogonal to the first axis, wherein the second axis and the first axis are each orthogonal to a longitudinal axis of the bore (e.g., along the y-axis).

A cross-section of the array of magnets 100 (e.g., a cross-section of each magnet segment) in a plane orthogonal to the longitudinal axis of the bore is preferably noncircular, but can alternatively be circular. For example, a cross-section of the array of magnets 100 in a plane orthogonal to the longitudinal axis of the bore can be or approximate an ellipse, a rounded rectangle (e.g., squircle), a polyhedron, any oblong shape (e.g., with its dimension in the z-direction greater than its dimension in the x-direction; wherein the longitudinal axis of the bore extends along the y-axis), and/or any other shape.

Figure 4A:
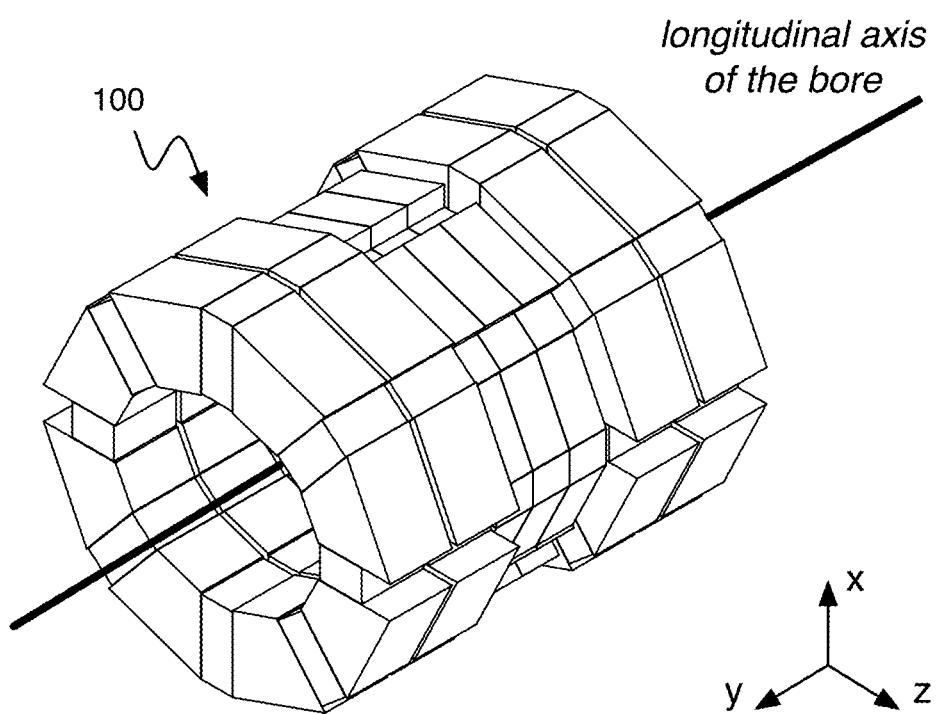
FIG. 4A is an isometric view of an example of the array of magnets.

The bore can be configured to receive a finger. For example, a sample interface 800 that includes an aperture can be positioned within the bore, wherein the finger is positioned within the aperture. In a specific example, the bore extends along the y-axis (e.g., as shown in FIG. 4A), and a finger (the sample) is inserted in the bore (e.g., inserted into the aperture of the finger interface 800 within the bore) such that the proximal-distal axis (e.g., the longitudinal axis) of the finger extends approximately parallel to the longitudinal axis of the bore (e.g., within 15 degrees, within 10 degrees, within 5 degrees, within 2 degrees, within 1 degree, etc.). In this specific example, the pulp of the finger (e.g., a vector extending from the fingernail to the finger pulp) can be facing in the negative z-direction or the positive z-direction. In a specific example, the pulp of the finger can intersect with the longitudinal axis of the bore. However, the pulp of the finger can alternatively face the positive or negative x-direction and/or any other direction. The sample can optionally be offset within the bore (e.g., offset in the z direction; the longitudinal axis of the finger is offset relative to the longitudinal axis of the bore). For example, when the sample is a finger, the sample can be offset such that a target region of the finger (e.g., the pulp of the finger) intersects with the longitudinal axis of the bore. In a specific example, the finger can be positioned within the bore such that a proximal-distal axis of the finger is offset from the longitudinal axis of the bore (e.g., where the proximal-distal axis of the finger is approximately parallel to the longitudinal axis of the bore).

In a specific example, the height of the array of magnets 100 (e.g., in the z-direction) can be between 15 mm-1000 mm or any range or value therebetween (e.g., 20 mm-500 mm, 30 mm-100 mm, 60 mm-80 mm, etc.). In a specific example, the width of the array of magnets 100 (e.g., in the x-direction) can be between 15 mm-1000 mm or any range or value therebetween (e.g., 20 mm-500 mm, 30 mm-100 mm, 60 mm-80 mm, etc.). The width of the array of magnets 100 is preferably less than the height of the array of magnets 100, but can alternatively be greater than the height of the set of magnets 100. In a specific example, the height of the array of magnets 100 along a first axis (e.g., wherein the first axis is parallel to the central axis of the surface coil and orthogonal to a longitudinal axis of the bore) is greater than a width of the array of magnets 100 along a second axis (e.g., wherein the second axis is orthogonal to the first axis and orthogonal to a longitudinal axis of the bore). In a specific example, the ratio between the height (e.g., in the z-direction) and the width (e.g., in the x-direction) of and the array of magnets 100 and/or of a magnet array segment in the array of magnets 100 can be between 1-3 or any range or value therebetween (e.g., at least 1, at least 1.05, at least 1.1, at least 1.2, at least 1.3, at least 1.5, at least 2, etc.). In a specific example, the longitudinal length of the array of magnets 100 (e.g., along the longitudinal axis of the bore) can be between 15 mm-1000 mm or any range or value therebetween (e.g., 20 mm-500 mm, 30 mm-100 mm, 60 mm-80 mm, etc.).

The array of magnets 100 can optionally be positioned such that the z-axis (e.g., the z-axis as shown in FIG. 4A) is oriented vertically, and the pulp of the finger faces the ground. In variants, this arrangement can enable the array of magnets 100 to interface with both left and right fingers (individually).

Figure 4B:
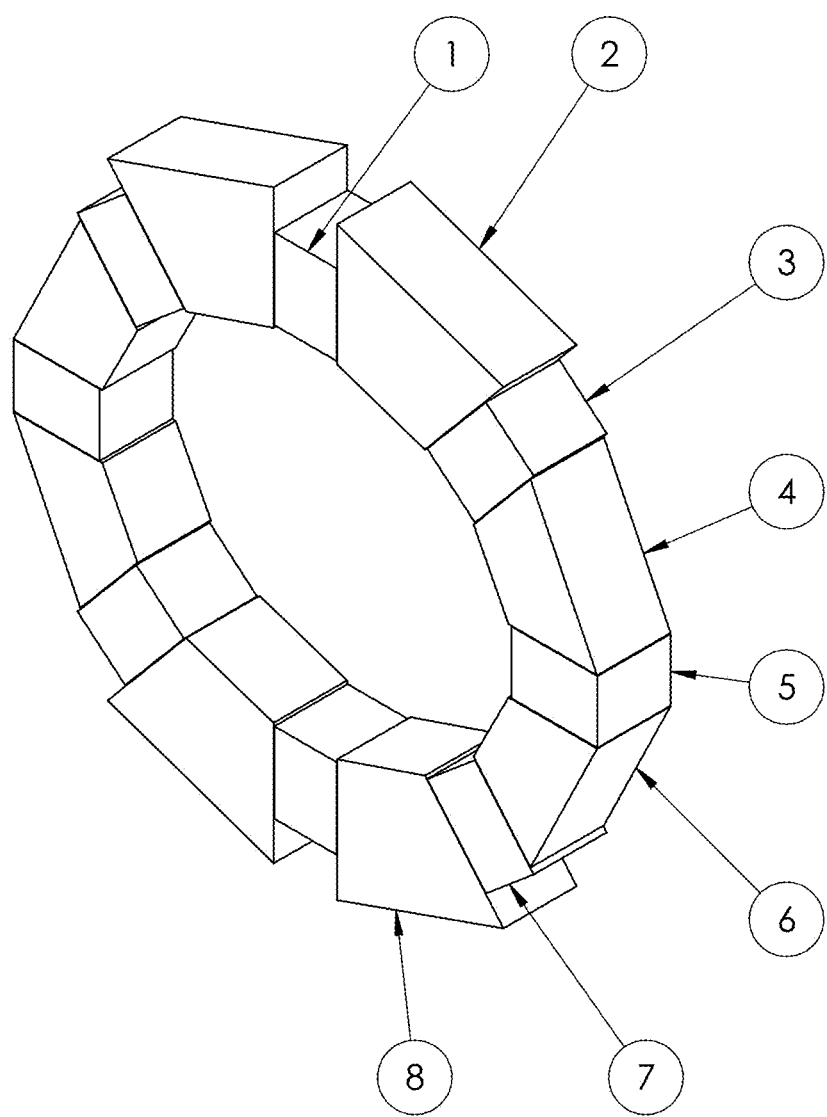
FIG. 4B is an isometric view of an example of a subset of the array of magnets.
Figure 4C:
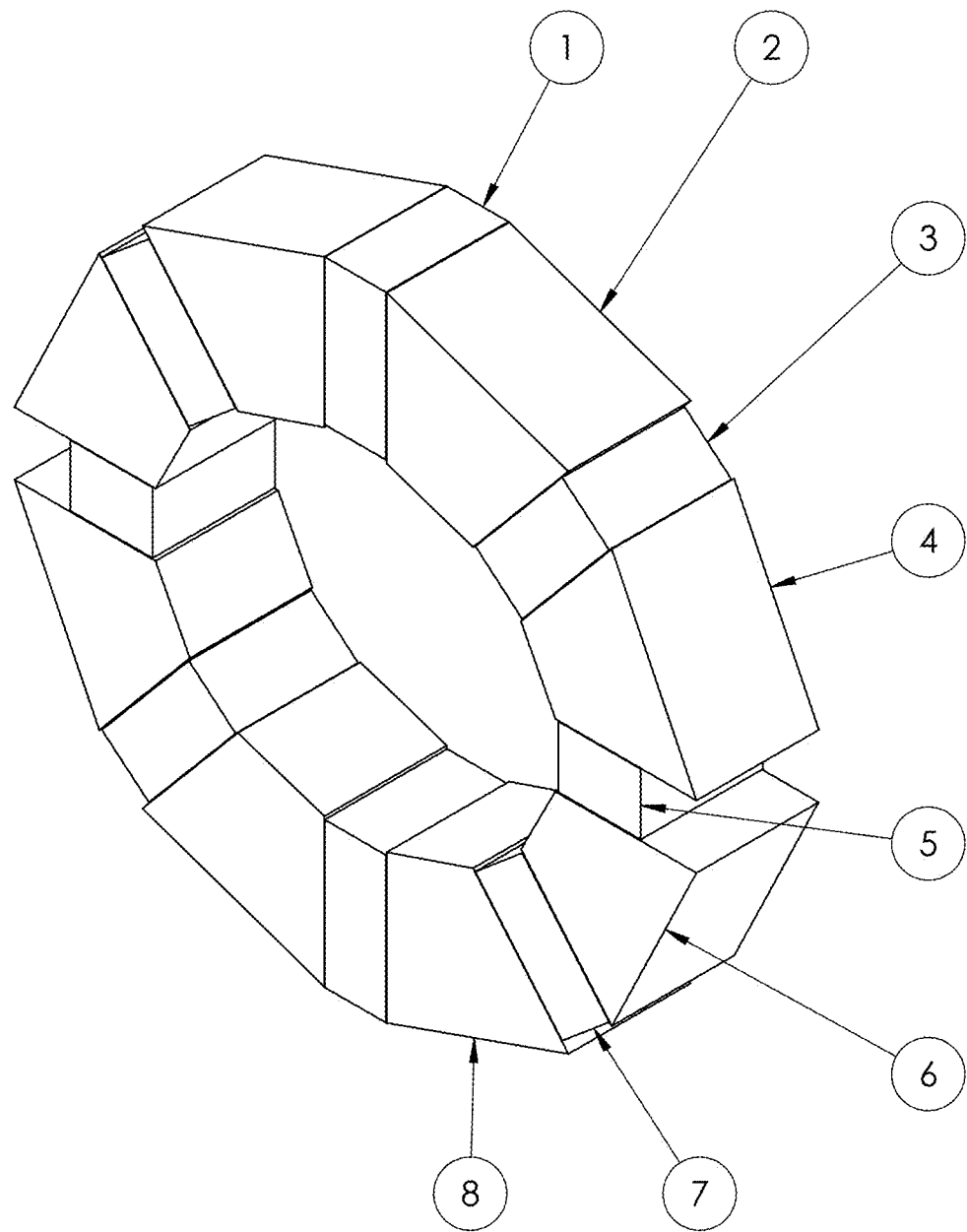
FIG. 4C is an isometric view of another example of a subset of the array of magnets.
Figure 5A:
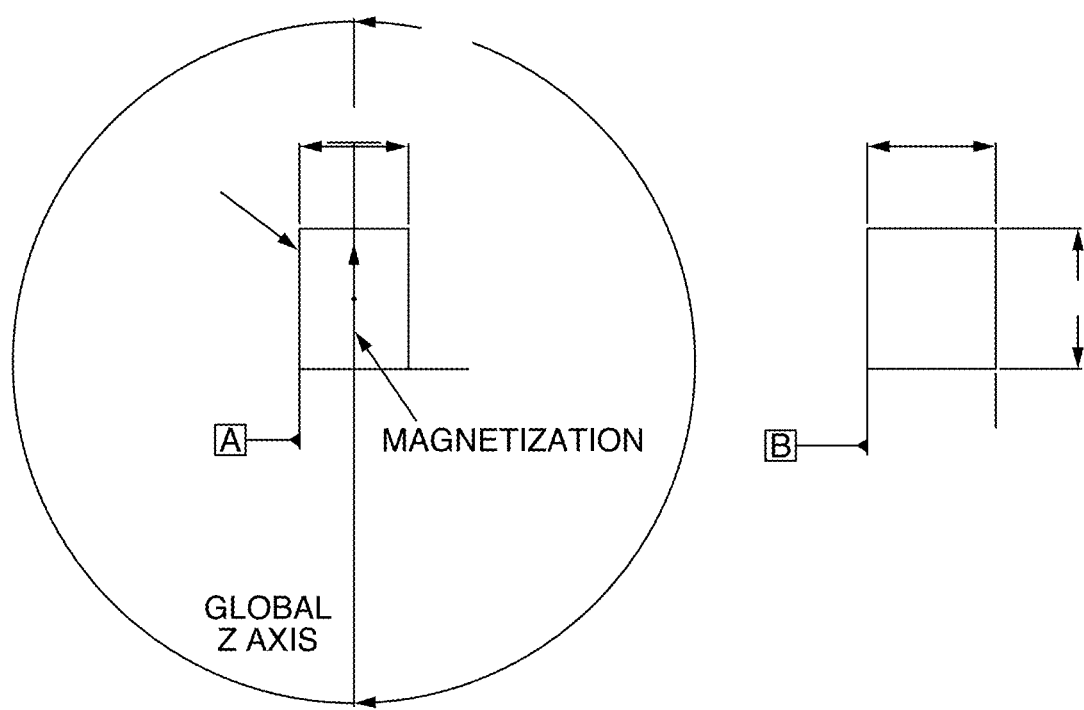
FIGS. 5A-5H are cross-sectional views of example magnets in the array of magnets (e.g., magnets in FIG. 4B and/or FIG. 4C).
Figure 5B:
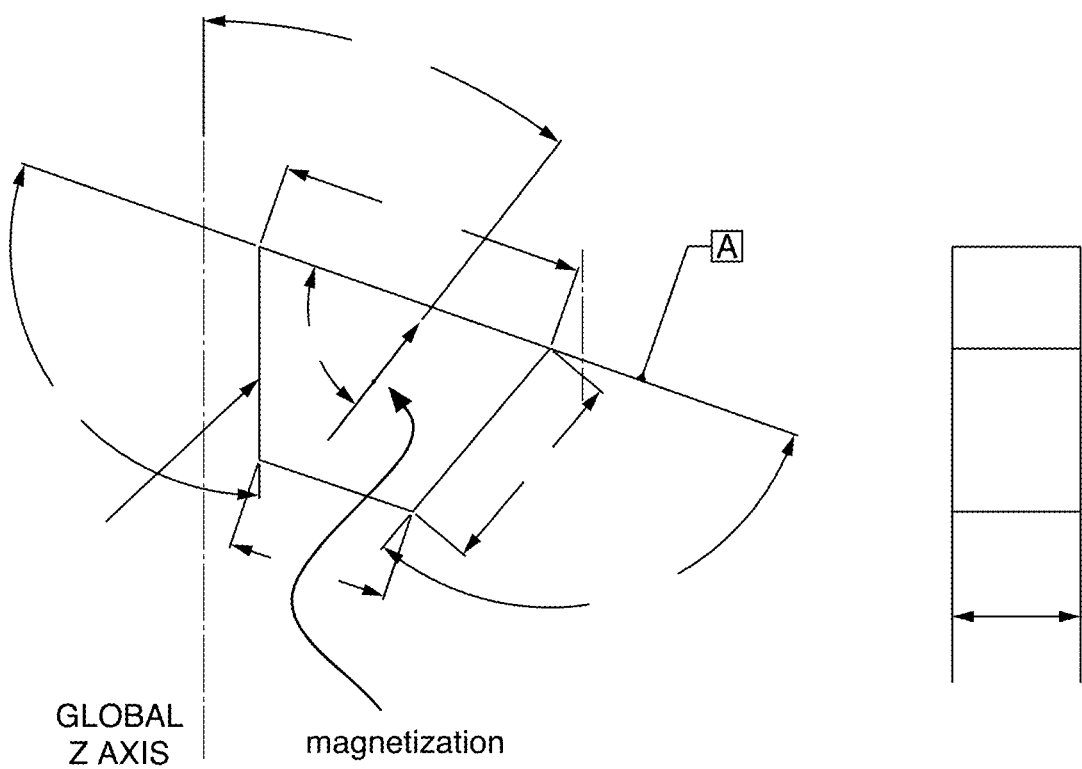
Figure 5C:
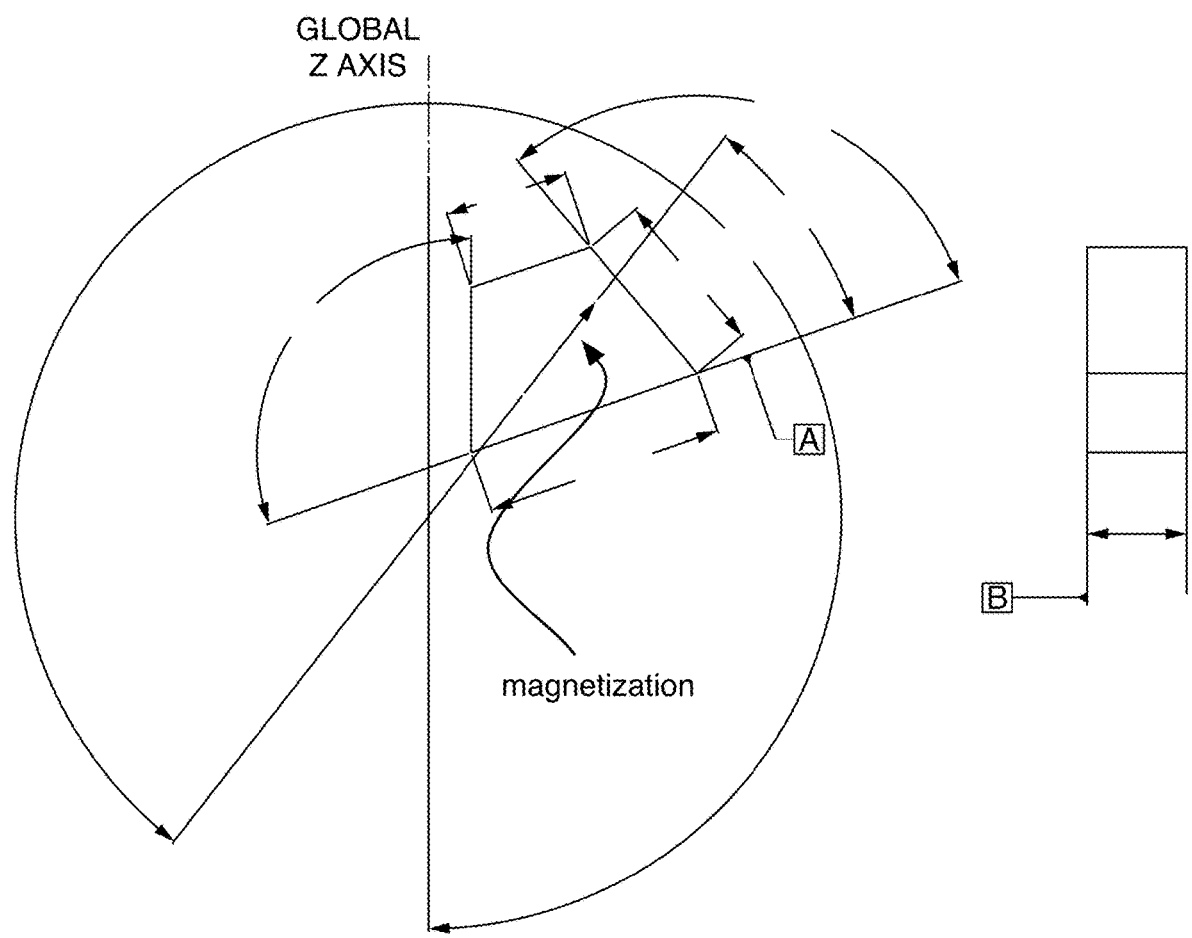
Figure 5D:
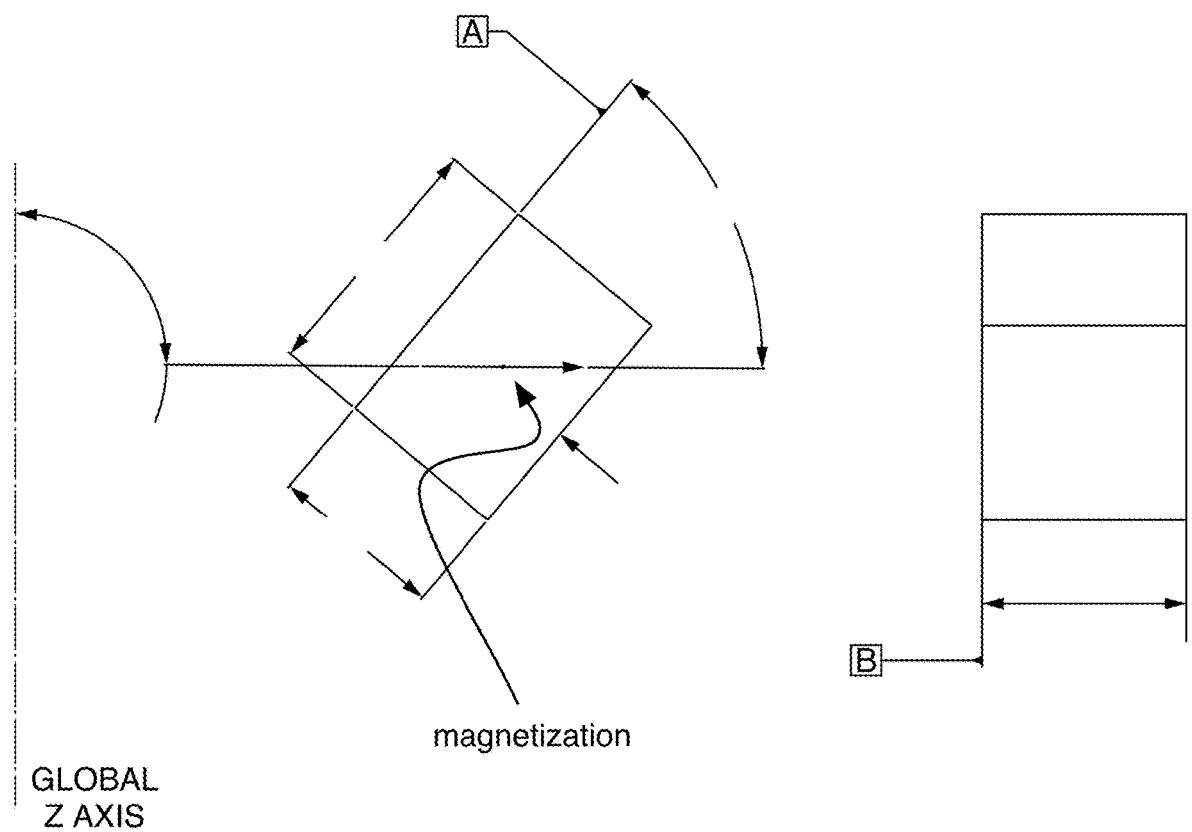
Figure 5E:
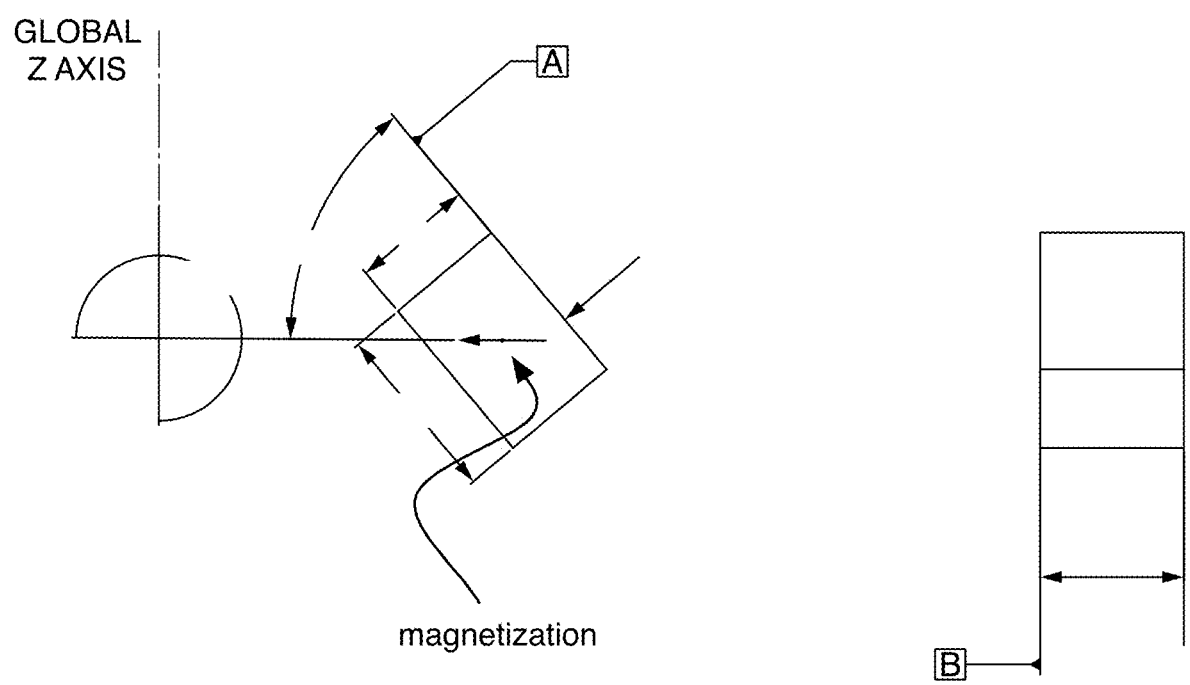
Figure 5F:
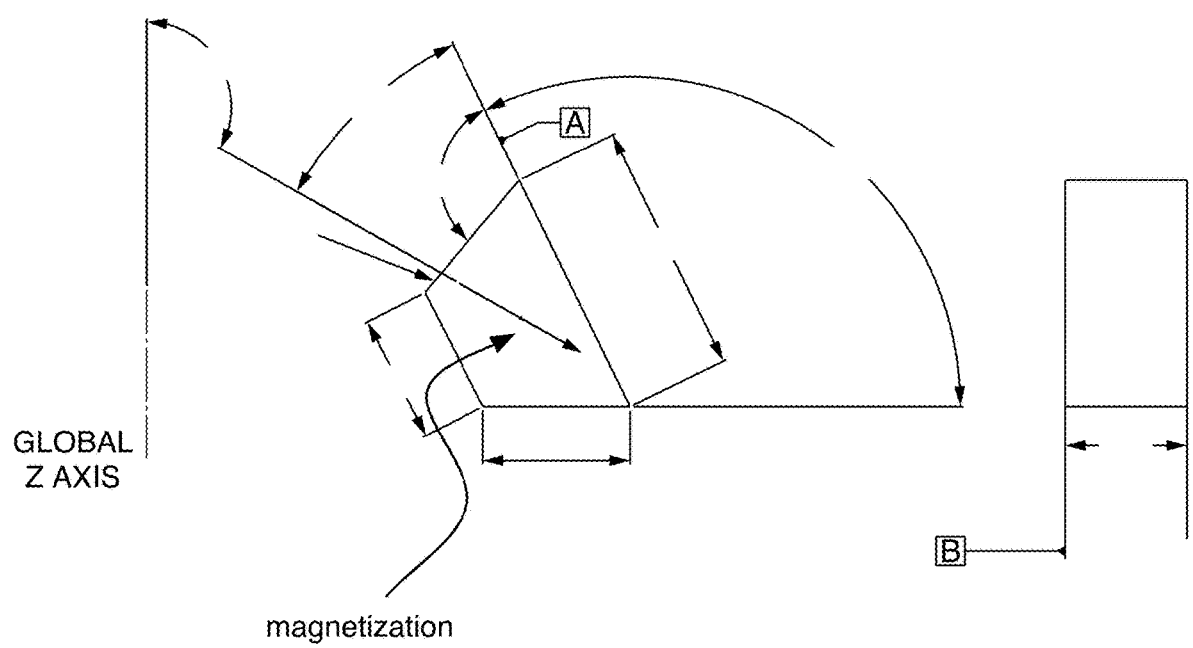
Figure 5G:
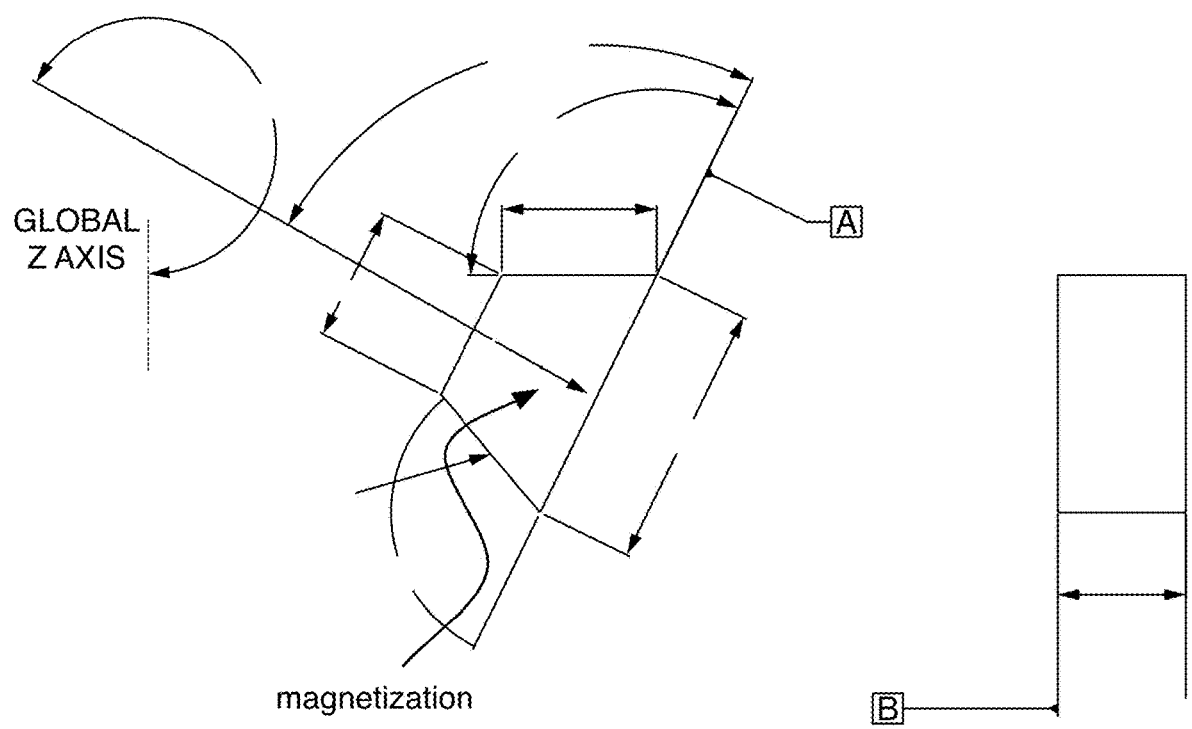
Figure 5H:
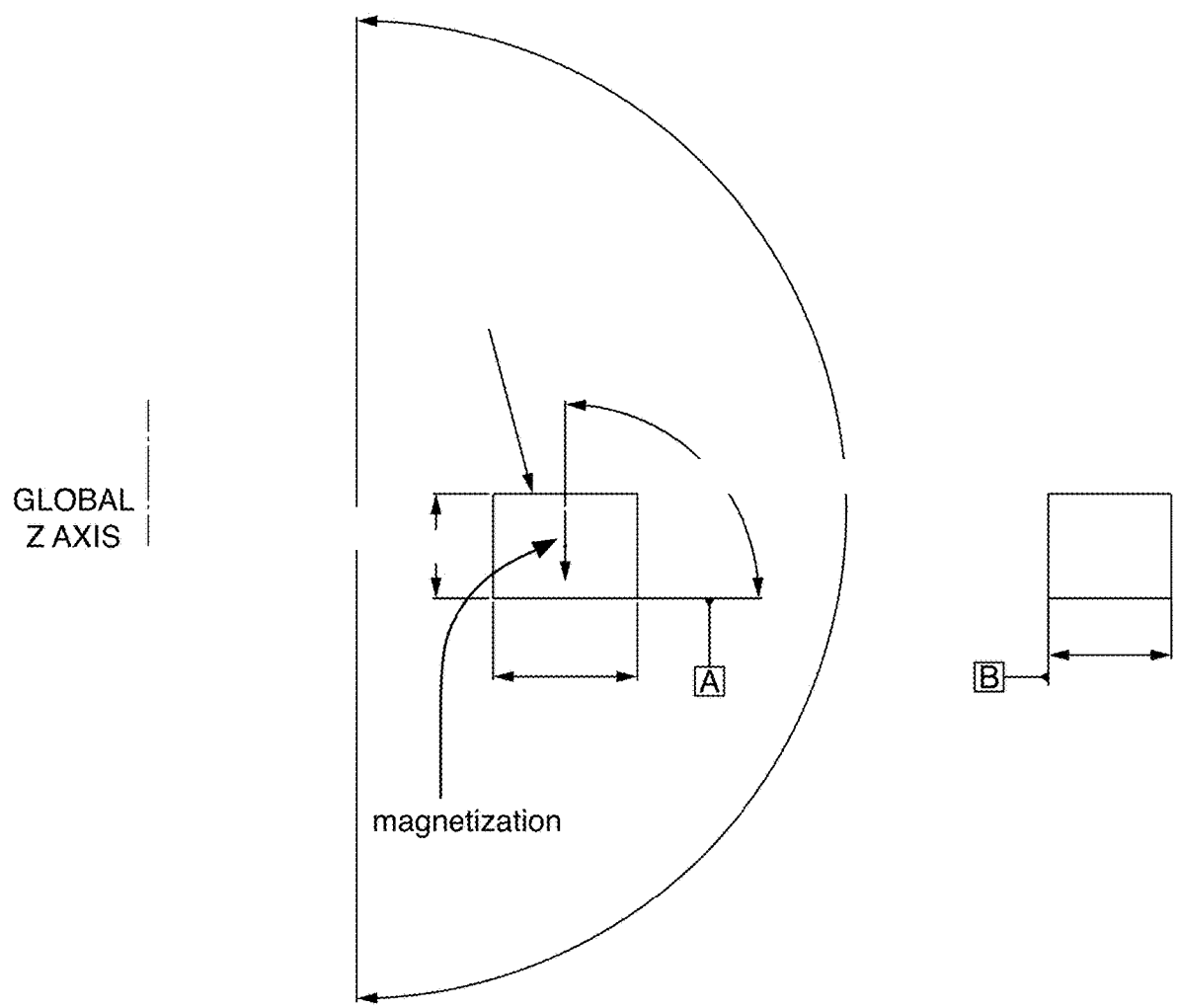

The array of magnets 100 can include one or more magnet array segments. Examples of magnet array segments are shown in FIG. 4B and FIG. 4C. Each magnet array segment can include one or more magnets arranged arcuately around the bore. In an example, a magnet array segment includes an annular arrangement of magnets (e.g., a ring of magnets). In a specific example, the number of magnets in each magnet array segment (e.g., each ring of magnets) can be between 4-100 or any range or value therebetween (e.g., at least 4, at least 8, at least 12, at least 16, at least 24, etc.). Different magnet array segments can include the same numbers of magnets or a different number of magnets. The number of magnets in each magnet array segment is preferably even, but can alternatively be odd. In a specific example, each magnet array segment contains at least two magnets that are not substantially identical (e.g., not all magnets in the magnet array segment are substantially identical). In a second specific example, each magnet array segment contains at least two substantially identical magnets. In a third specific example, each magnet array segment contains at least two magnets that are not substantially identical and contains at least two substantially identical magnets. Substantially identical magnets can be substantially identical in their material, mass, geometry (e.g., shape, dimensions, etc.), magnetic field properties (e.g., magnetic field strength, magnetic field shape, etc.), and/or any other parameter. Each magnet array segment preferably is not a Halbach array or a portion of a Halbach array, but can alternatively form all or a portion of a Halbach array.

In an example, each magnet can be a three-dimensional shape (e.g., prism, cylinder, etc.) where two parallel bases of the shape (e.g., parallel to the xz plane) are a: trapezoid, sector, annulus sector (e.g., with an inner arc length and outer arc length), rectangle, and/or any other shape. The geometry of each magnet can optionally be defined by a shape class. Examples of shape classes include: trapezoidal prism, rectangular prism, sector of a cylindrical shell, and/or any other shape classification. In an example, one or more magnet array segments (e.g., each magnet array segment) can include magnets from at least two different shape classes (e.g., trapezoidal prism shape class and rectangular prism shape class). For example, the shape class of a first subset of magnets (e.g., a subset of magnets in the array of magnets 100 and/or a subset of the magnets in a magnet array segment) can be different than the shape class of a second subset of magnets. In a specific example, the first subset of magnets can be trapezoidal prisms (e.g., with the same or different dimensions across the magnets in the first subset of magnets), and the second subset of magnets can be rectangular prisms (e.g., with the same or different dimensions across the magnets in the first subset of magnets).

Adjacent magnets in a magnet segment can optionally be from different shape classes. For example, the magnets can be arranged in an alternating pattern around the bore (e.g., alternating between the trapezoidal prism shape class and the rectangular prism shape class). In an example, the array of magnets 100 can include multiple magnet array segments stacked along a longitudinal axis of the bore, wherein each magnet array segment includes a first set of magnets from a first shape class (e.g., trapezoidal prisms) and a second set of magnets from a second shape class (e.g., rectangular prisms), the first set of magnets and the second set of magnets arranged in an alternating pattern around the bore.

In a specific example, the thickness of a magnet (between two parallel bases of the magnet parallel to the xz plane; along the y-axis) can be between 1 mm-100 mm or any range or value therebetween (e.g., 2 mm-10 mm, etc.). In a specific example, when the magnet base (e.g., in the xz plane) is a trapezoid (e.g., for a trapezoidal prism magnet), the inner (short) base length can be between 1 mm-100 mm or any range or value therebetween (e.g., 5 mm-10 mm, etc.); the outer (long) base length can be between 1 mm-200 mm or any range or value therebetween (e.g., 5 mm-50 mm, 10 mm-20 mm, etc.); and/or the height of the trapezoid can be between 1 mm-100 mm or any range or value therebetween (e.g., 5 mm-10 mm, etc.). In a specific example, when the magnet base is a rectangle (e.g., for a rectangular prism magnet), the width (e.g., in the xz plane) can be between 1 mm-100 mm or any range or value therebetween (e.g., 5 mm-10 mm, etc.); and/or the height (e.g., in the xz plane) can be between 1 mm-100 mm or any range or value therebetween (e.g., 5 mm-10 mm, etc.). Examples are shown in FIGS. 5A-5H.

All or a subset of the magnets in the magnet array 100 can optionally have a magnetization vector where the angle of the magnetization vector is determined using a model. For example, the angle of the magnetization vector of a magnet in the magnet array 100 can be determined based on the anisotropic permeability of the magnet material, the geometry of the magnet array 100, the placement of the magnet within the magnet array 100, the geometry of the magnet, one or more targets (e.g., the target magnetic field of the magnet array 100, the ROI, etc.), and/or any other suitable information. In a specific example, the angle of the magnetization vector of each magnet is not equivalent to the angle of the magnetization vector for a Halbach system (e.g., the angle of the magnetization vector is offset from double theta).

However, each magnet can be otherwise configured.

In variants, the magnetic field can be measured (e.g., using a 3 axis Helmholtz coil) for one or more magnets in the magnet array 100, and the individual placement of each magnet in the magnet array 100 can be determined based on the measurements. For example, a model can be used to sort each magnet into available placement (e.g., location) in the magnet array 100 (e.g., each magnet is sorted into one placement in a set of available placements in the magnet array 100 that correspond to the geometry of the magnet) based on: the measured magnetic field of the magnet, the measured magnetic field of other magnets, the geometry of the magnet array 100 (e.g., magnet placement options for each magnet geometry), other shimming parameters (e.g., parameters for button shimming, parameters for ink shimming, parameters for active shimming, etc.), and/or any other suitable information. In a specific example, magnets with substantially identical geometries that have small differences in their magnetic field (e.g., due to imperfections in manufacturing) can be rearranged (e.g., sorted) in the magnet array 100 to increase homogeneity of the magnetic field in the ROI. In a specific example, the number of substantially different magnet geometries in the array of magnets 100 (e.g., the total number of unique magnet elements) can be between 2-100 or any range or value therebetween (e.g., at least 2, at least 3, at least 4, at least 5, at least 10, at least 15, at least 16, at least 20, etc.).

Each magnet array segment can form any geometry based on a combination of the constituent magnet geometries (e.g., a combination of the magnet geometries and the housing 200). In examples, the magnet array segment is a cylindrical shell (e.g., annular cylinder), an elliptic cylindrical shell, a polyhedron with genus 1 (e.g., a polyhedron containing a bore), any shape with genus 1, and/or any other three-dimensional shape. The longitudinal thickness of a magnet array segment (e.g., longitudinal length along the y-axis) is preferably equal to the longitudinal thickness of the constituent magnets, but can alternatively be different than the longitudinal thickness of the magnets (e.g., the magnets are different thicknesses, the magnet bases are offset, etc.). In a specific example, when the magnet array segment contains a bore, the width of the bore (e.g., in the x-direction; the outer diameter of the bore in the case of a circular bore) can be between 10 mm-500 mm or any range or value therebetween (e.g., 15 mm-100 mm, 20 mm-40 mm, etc.). In a specific example, when the magnet array segment contains a bore, the height of the bore (e.g., in the z-direction; the outer diameter of the bore in the case of a circular bore) can be between 10 mm-500 mm or any range or value therebetween (e.g., 15 mm-100 mm, 20 mm-40 mm, etc.). The height (e.g., in the z-direction) of the magnet array segment is preferably greater than the width of the magnet array segment (e.g., in the x-direction). In a specific example, the height of the magnet array segment can be between 15 mm-1000 mm or any range or value therebetween (e.g., 20 mm-500 mm, 30 mm-100 mm, 60 mm-80 mm, etc.). In a specific example, the width of the magnet array segment can be between 15 mm-1000 mm or any range or value therebetween (e.g., 20 mm-500 mm, 30 mm-100 mm, 60 mm-80 mm, etc.). In a specific example, the spacing between magnets (arcuate spacing, radial offset between magnets, etc.), the angle between each magnet, the outer and/or inner diameter of the magnet array segment, and/or any other magnet arrangement properties can be adjustable (e.g., during manufacturing, prior to mounting to the housing, etc.). However, the magnet array segment can be otherwise configured.

The array of magnets 100 can include one or more magnet array segments (e.g., 1, 2, 3, 4, 5, 6, 7, 8, 9, 10, 11, 12, at least 3, at least 6, at least 8, at least 10, etc.). An example is shown in FIG. 4A. The magnet array segments are preferably arranged longitudinally along the same axis (e.g., stacked; defining a single, continuous bore), but can alternatively be otherwise arranged. The arcuate angle between the magnet array segments is preferably 0 degrees (e.g., such that adjacent magnets from different magnet array segments are axially aligned), but can alternatively be nonzero. In a specific example, the axial length of the magnet array 100 (including the one or more magnet array segments) can be between 5 mm-500 mm or any range or value therebetween (e.g., 10 mm-200 mm, 50 mm-100 mm, etc.). In a specific example, the longitudinal spacing between magnet array segments can be between 0.01 mm-20 mm or any range or value therebetween (e.g., 0.25 mm-5 mm, 0.5 mm-1 mm, etc.). In a specific example, the arcuate angle between the magnet array segments, the spacing between the magnet array segments, and/or any other magnet array segment arrangement properties can be adjustable (e.g., during manufacturing, prior to mounting to the housing, etc.).

In a first example, the array of magnets 100 contains at least two magnet array segments that are not substantially identical (e.g., not all magnet array segments in the array of magnets 100 are the substantially identical). In a second example, the array of magnets 100 contains at least two substantially identical magnet array segments. In a third example, the array of magnets 100 contains at least two magnet array segments that are not substantially identical and contains at least two substantially identical magnet array segments. Substantially identical magnet array segments can be substantially identical in their magnet arrangements, constituent magnet properties (e.g., geometry, material, etc.), magnetic field properties (e.g., magnetic field strength, magnetic field shape, etc.), and/or any other parameter. In an example, the array of magnets 100 contains: a first subset of magnet array segments with a first width (e.g., along the x-axis, where the longitudinal axis of the bore is the y-axis) and a first height (e.g., along the z-axis, where the longitudinal axis of the bore is the y-axis); a second subset of magnets (stacked between the first and the third subsets of magnets) with a second width and a second height; and a third subset of magnets with a third width and a third height. In a specific example, the second width is less than the first and the third widths (e.g., where the first width and third width are substantially identical). In another specific example, the second height is less than the first and third heights (e.g., where the first height and third height are substantially identical). The bore can optionally be substantially identical across the first, second, and third subsets of magnet array segments. In an illustrative example, the magnet array 100 can form a barbell shape, with one or more magnet array segments (e.g., 1, 2, 3, 4, etc.) at each end of the bore that has a larger width (e.g., along the x-direction, where the longitudinal axis of the bore is the y-axis; along an axis perpendicular to the longitudinal axis of the bore) and/or height (e.g., along the z-direction, where the longitudinal axis of the bore is the y-axis; along an axis perpendicular to the longitudinal axis of the bore) than one or more magnet array segments (e.g., 1, 2, 3, 4, etc.) at the midpoint of the bore.

However, the array of magnets 100 can be otherwise configured.

The housing 200 functions to connect and/or mount components of the system 10. For example, the housing 200 can retain: the array of magnets 100, the set of coils 300, the set of passive shims 400, all or a portion of the processing system 500, and/or any other system component. The each magnet in the array of magnets 100 can optionally be glued to the housing. The glue can be a cyanoacrylate, epoxy, UV resin, and/or any other adhesive. In a specific example, a cyanoacrylate adhesive can enable fast and rigid bonding of the magnets to the housing. Potting can optionally be used to reduce moisture in the assembly (and thus reduce moisture absorbed by the glue).

In variants, the housing 200 includes one or more housing segments, wherein each housing segment can retain a magnet array segment. In an example, the housing segment can be a shell, wherein one or more magnets in the magnet array segment can be mounted to the inside of the shell. In a specific example, a first subset of magnets in the magnet array segment are mounted to the inside of the shell (e.g., using thermal bonding), and a second subset of magnets in the magnet array segment are then mounted to adjacent magnets in the first subset of magnet array segments (e.g., using thermal bonding).

The position (e.g., radial position; distance to the center of the bore) of one or more magnets in the magnet array 100 can optionally be adjusted (e.g., during manufacturing, during shimming, etc.) to adjust the magnetic field (e.g., to increase homogeneity of the magnetic field in the ROI.). The position can optionally be determined based on magnetic field measurements. In a specific example, the position adjustment can be between 0 mm-5 mm or any range or value therebetween (e.g., 0.5 mm, 1 mm, 2 mm, 3 mm, etc.). For example, the one or more magnets can be actuated automatically, manually, and/or otherwise moved. In a specific example, a first subset of magnets (e.g., trapezoidal magnets) in a magnet array segment are mounted to a housing segment, and magnets in a second subset of magnets (e.g., rectangular prism magnets) in the magnet array segment are positioned (e.g., moved radially inward and/or outward) and then mounted to an adjacent magnet in the first subset of magnet array segments. The housing segment can optionally include recesses that extend radially outward from the bore (e.g., protrusions away from the bore). In a first example, the set of recesses (e.g., a subset of the set of recesses) can allow magnets in the magnet array segment to be moved radially outward. In a specific example, the housing 200 can have recesses over a subset of magnets in the array of magnets 100 (e.g., magnets from the rectangular prism shape class), wherein all or a subset of the subset of magnets are shifted radially outward into the recesses. In a second example, the set of recesses (e.g., a subset of the set of recesses) can allow magnets in the magnet array segment to be gripped (e.g., by a robotic gripper) while being mounted (e.g., glued) to the housing. In a specific example, the housing can include recesses over a midline of a subset of the array of magnets 100 (e.g., the magnets from the trapezoidal prism shape class). Examples are shown in FIG. 3, FIG. 6A, FIG. 6B, FIG. 6C, FIG. 6D, and FIG. 6E.

The housing 200 is preferably configured such that the overall NMR system is portable (e.g., a desktop device, etc.), but can alternatively be otherwise configured. In a specific example, the volume of the housing 200 can be between 20 $cm^3$-1 $m^3$ or any range or value therebetween (e.g., 50 $cm^3$-100,000 $cm^3$, 100 $cm^3$-10,000 $cm^3$, 500 $cm^3$-1000 $cm^3$, etc.). The housing footprint can be between 5 $cm^2$-10,000 $cm^2$ or any range or value therebetween (e.g., 10 $cm^2$-1000 $cm^2$, 50 $cm^2$-100 $cm^2$, etc.). The housing material can include aluminum, plastic, foam (e.g., to retain components, for potting, for thermal insulation, to reduce electromagnetic interference, etc.), any ferrous material, any non-magnetic material, any light-weight material (e.g., such that the overall weight is less than 50 kg, 10 kg, 5 kg, 2 kg, 1 kg, 0.5 kg, etc.) and/or any other material. The housing 200 can optionally be potted.

However, the housing 200 can be otherwise configured.

The system 10 can optionally include a set of coils 300, which functions as an NMR probe, inducing magnetization in the sample and detecting resulting signals from the sample. The set of coils 300 can include one or more of: a transmit coil 320, a receive coil 340, a set of gradient coils 360, and/or an active shim coil 380. The set of coils 300 can optionally be mounted to the housing 200 (e.g., via one or more supports).

The transmit coil 320 functions to apply a radiofrequency (RF) sequence within the ROI. The transmit coil 320 preferably includes a solenoid, but can additionally or alternatively include any other coil type. For example, the transmit coil 320 can be oriented such that the central axis of the solenoid is parallel to the longitudinal axis of the bore (e.g., the central axis of the solenoid is parallel to the longitudinal axis of the finger and/or the aperture of the sample interface 800). However, the transmit coil 320 can be otherwise configured.

The receive coil 340 functions to receive signals from excited spins in the sample. In a specific example, the number of loops in the receive coil 340 can be between 1-50 or any range or value therebetween (e.g., 2, 3, 4, 5, less than 10, less than 5, etc.), but can alternatively be greater than 50. The receive coil 340 is preferably a surface coil, but can alternatively be or include a butterfly coil, a solenoid (e.g., the receive coil 340 is the transmit coil 320, wherein the transmit coil 320 can be a transceiver), and/or any other coil type. The receive coil 340 can optionally be a non-planar surface coil. The central axis of the receive coil 340 can optionally be oriented to intersect with a target region of the sample (e.g., the pulp of the finger) during a scan (e., while the finger is positioned within the aperture of the finger interface 800). For example, the central axis of the surface coil can intersect with the pulp of the finger, and the longitudinal axis of the bore can intersect with the pulp of the finger. In a specific example, the central axis of the receive coil 340 can be parallel to and/or coincident with the z-axis. The receive coil 340 is preferably oriented orthogonal to the transmit coil 320, but can alternatively be otherwise arranged. However, the receive coil 340 can be otherwise configured.

The set of gradient coils 360 functions to modulate the magnetic field, which can enable isolation of a volume of interest (e.g., target region; slice, line, voxel, any other region, etc.) of the ROI. The set of gradient coils 360 can impart a magnetic field gradient along one or more axes (e.g., 1 axis, 2 axis, 3 axis, etc.; with one or more gradient coils for each axis). However, the set of gradient coils 360 can be otherwise configured.

However, the set of coils 300 can be otherwise configured.

The system 10 can optionally include a set of passive shims 400 (e.g., set of localized shims) which function to fine-tune the homogenization of the magnetic field within the ROI. The set of passive shims 400 can be located: outside the bore, within the bore, between magnets in the array of magnets 100, between a magnet and a coil in the set of coils, and/or otherwise located. The set of passive shims 400 can optionally be located on one or more sheets, wherein the sheet(s) can optionally be removably mounted to the housing 200. In examples, the set of passive shims 400 can include button shims, ferrous components (e.g., steel), magnetic ink, and/or any other shims. However, the set of passive shims 400 can be otherwise configured.

The system 10 can optionally include a processing system 500, which functions to: send sequences to the transmit coil 320, set of gradient coils 360, and/or active shim coil 380; process signals received by the receive coil 340 (e.g., to determine analyte levels, to generate images of the sample; etc.); control the thermal regulation system; store measured analyte levels; and/or perform other functionalities. The processing system 500 can include one or more: CPUs, GPUs, custom FPGA/ASICS, microprocessors, servers, cloud computing, and/or any other suitable components. The processing system 500 can be local (e.g., mounted within the housing 200), remote, distributed, and/or otherwise arranged relative to any other system or module. The processing system 500 can optionally communicate with a user device and/or a user interface (e.g., to display analyte levels, instructions to the user, etc.).

For example, the processing system 500 can be configured to perform a scan, wherein performing the scan includes: using the transmit coil, transmit an electromagnetic pulse sequence (e.g., the processing system sends the electromagnetic pulse sequence to the transmit coil), using the surface coil, sample a receive signal (e.g., the processing system receives the receive signal from the surface coil); and determine a concentration of a blood analyte (e.g., glucose) in the sample (e.g., finger) based on the receive signal.

However, the processing system 500 can be otherwise configured.

The system 10 can optionally include a thermal regulation system 600, which functions to maintain the sample and/or one or more system components at a target temperature, to reduce temperature gradients across system components, and/or otherwise regulate temperature. This can increase measurement accuracy (e.g., by reducing field fluctuations), increase the volume of blood in the sample, improve calibration, and/or otherwise improve system function. In a first example, the thermal regulation system 600 can include a heater and/or a cooler. In a specific example, the thermal regulation system 600 can include a Peltier junction. In another specific example, the thermal regulation system 600 can include a flexible board with self-canceling wiring that functions as a heater. The thermal regulation system 600 can be located on the outside of the housing 200, integrated into the housing 200 (e.g., at or near the sample aperture), and/or otherwise arranged relative to any system component. In an example, a first thermal regulation system (e.g., a heater, used to bring the system 10 up to a reference temperature before a first NMR acquisition run) can be located on the outer surface of the housing (e.g., between the housing 200 and the set of shields 700), and a second thermal regulation system (e.g., a Peltier device, used to cool the system 10 to regulate temperature during NMR acquisitions) can be located on the outside of the system 10.

The thermal regulation system 600 preferably maintains the sample and/or one or more system components above room temperature (e.g., 25° C., 30° C., 35° C., 37° C., 40° C., 45° C., body temperature, any range or value therebetween etc.), but can alternatively maintain the sample and/or one or more system components below room temperature. The thermal regulation system 600 can optionally include a sensor (e.g., temperature sensor, NMR measurements, etc.), wherein sensor measurements can be used to: flag an error, provide feedback to the thermal regulation system 600, adjust signal processing, and/or otherwise used. In a second example, the thermal regulation system 600 can include insulation. The insulation material can include: foam, potting material, plastics (e.g., PVC), and/or any other thermally insulating material. The insulation is preferably non-magnetic, but can alternatively be magnetic. However, the thermal regulation system 600 can be otherwise configured.

Figure 6A:
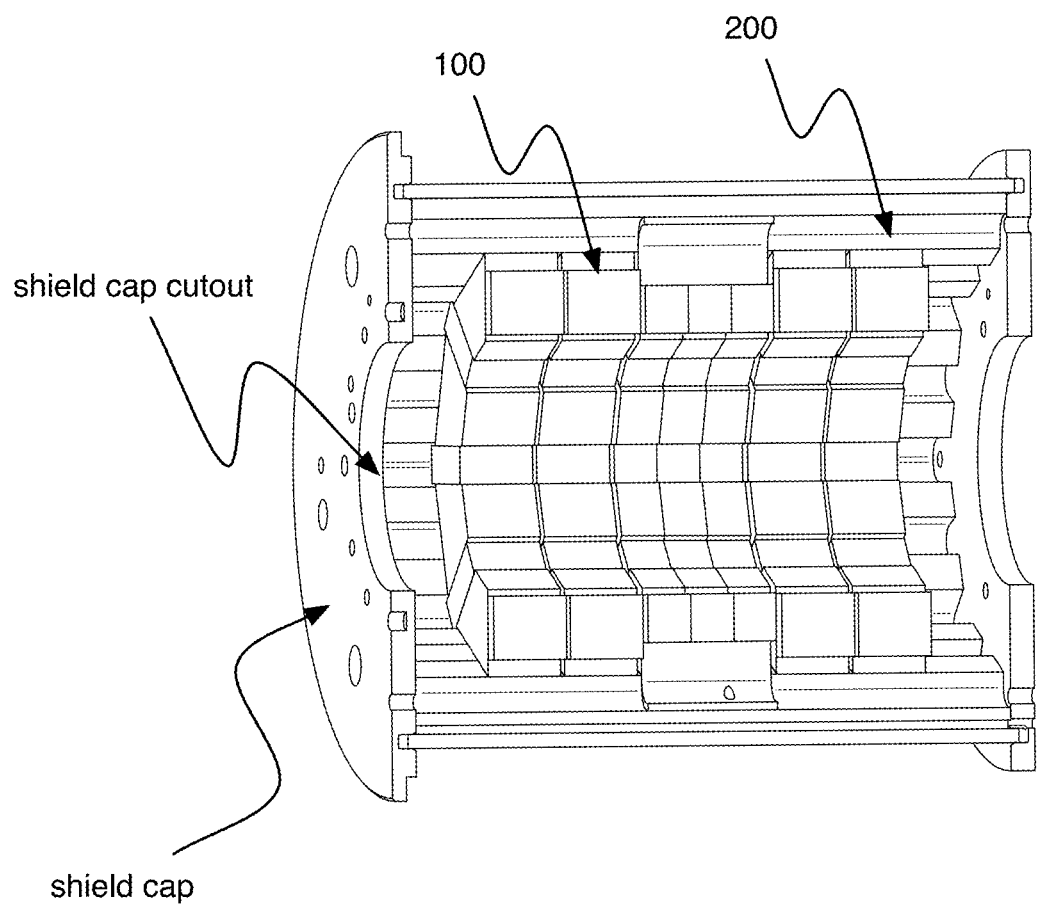
FIG. 6A depicts a specific example of a cross-sectional view of the system, including the housing, the array of magnets, and the set of shields (e.g., a cylindrical shell with a cap on each end of the cylindrical shell).
Figure 6B:
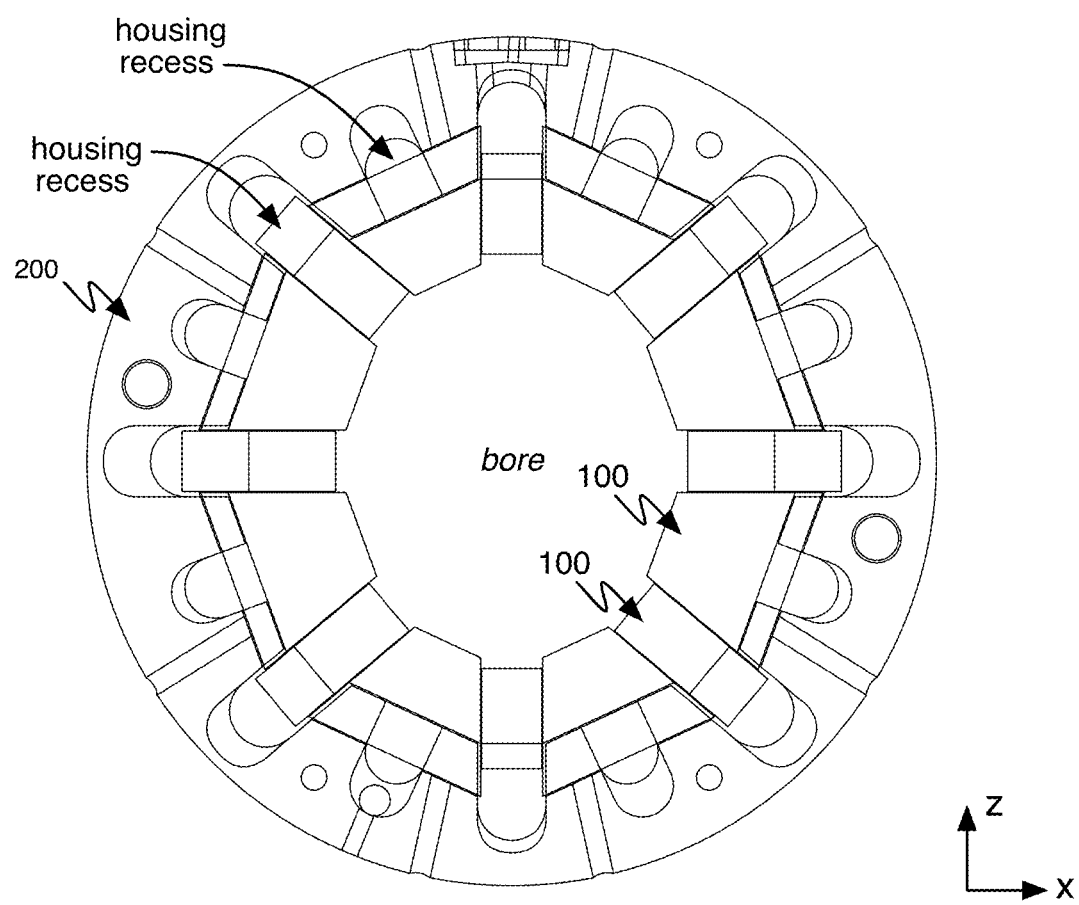
FIG. 6B depicts another specific example of a cross-sectional view of the system, including the housing and the array of magnets.
Figure 6C:
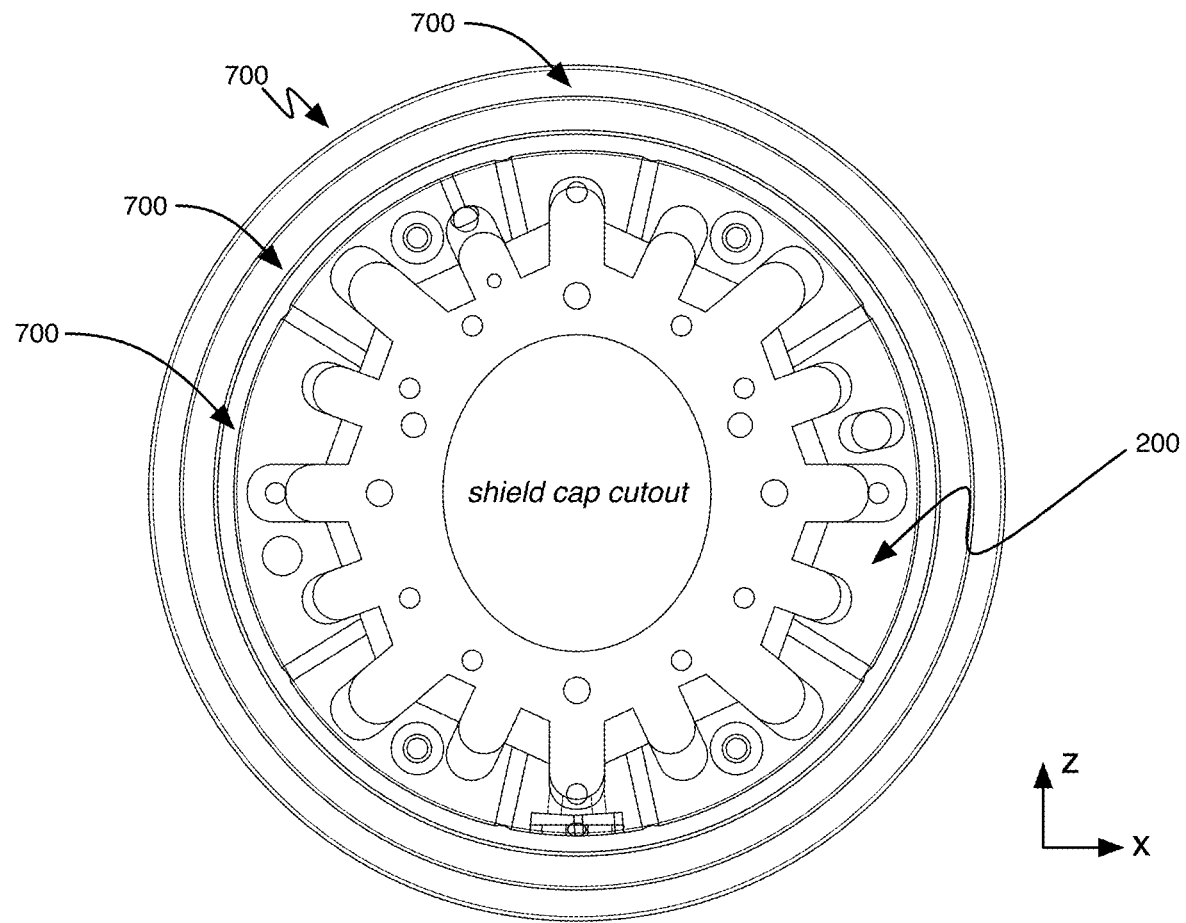
FIG. 6C depicts another specific example of a cross-sectional view of the system, including the housing, the array of magnets, and the set of shields (e.g., where the primary ferrous shield is shown with darker lines, and mu-metal shields in the two outer layers).
Figure 6D:
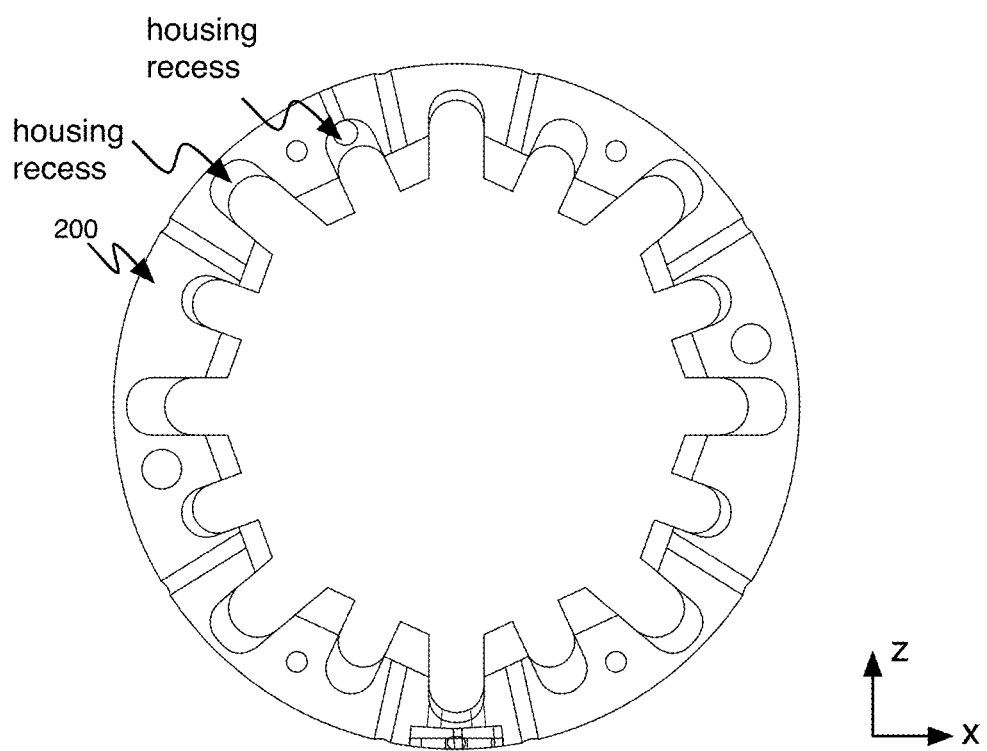
FIG. 6D depicts a specific example of a cross-sectional view of the housing.
Figure 6E:
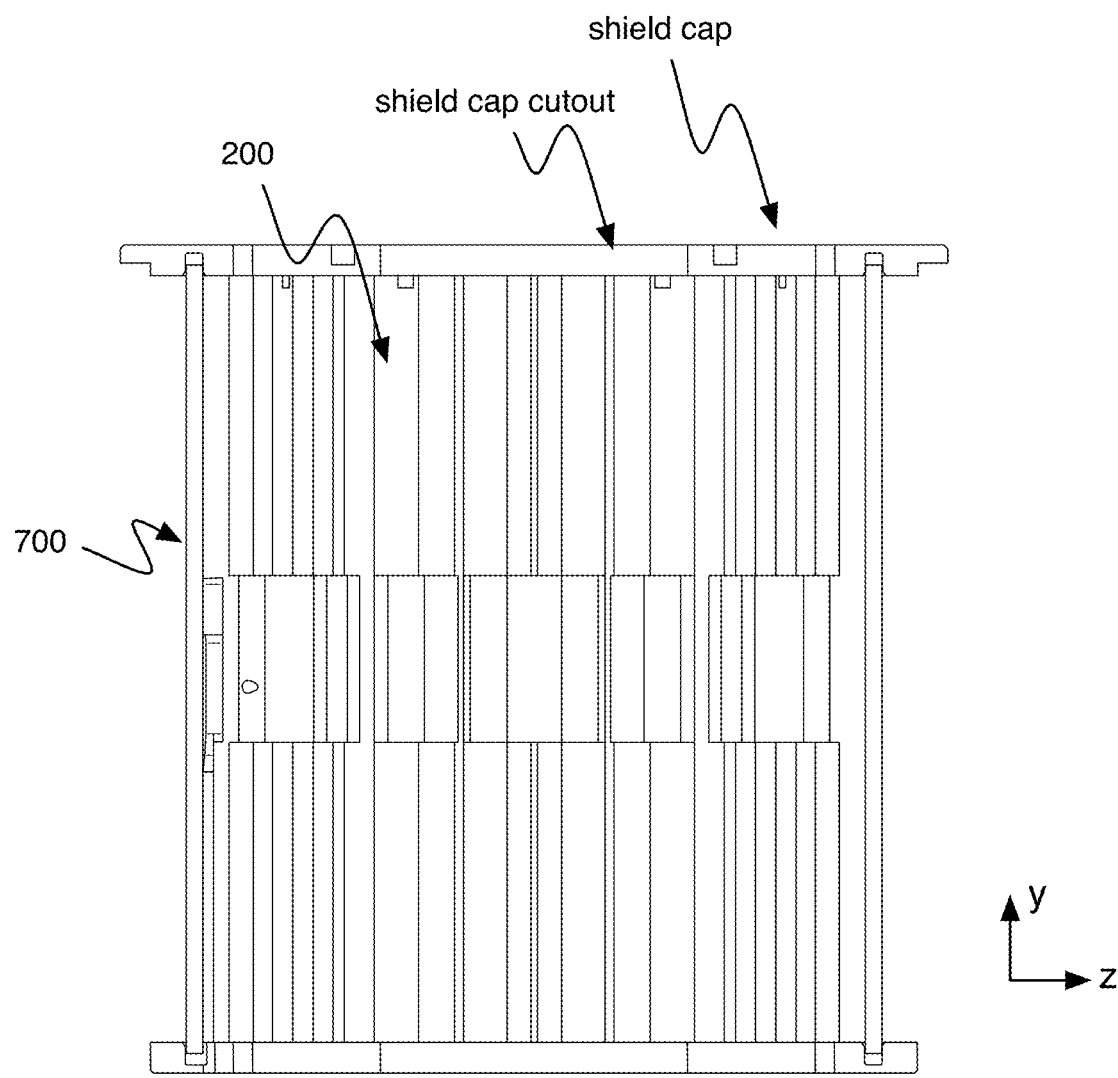
FIG. 6E depicts another specific example of a cross-sectional view of the system, including the housing, the array of magnets, and the set of shields (e.g., a cylindrical shell with a cap on each end of the cylindrical shell).

The system 10 can optionally include a set of shields 700, which functions redirect the magnetic field within the housing 200 (and/or reduce the magnetic field outside the housing 200), provide shielding between system components, and/or provide any other magnetic or electromagnetic interference (EMI) shielding. Examples are shown in FIG. 6A, FIG. 6C, and FIG. 6E. The set of shields 700 can be mounted to the outside of the housing 200, mounted within the housing 200 (e.g., between system components), and/or otherwise arranged relative to any system component. The shield material can include: mu-metal, steel (e.g., low carbon steel, 1008 steel), iron, nickel, cobalt, a combination of materials, any ferromagnetic material, any material with high (electromagnetic) permeability, and/or any other shielding material. In a specific example, the set of shields 700 can include 1-10 shields or any range or value therebetween (e.g., 1, 2, 3, 4, 5, at least 2, at least 3, etc.). In a specific example, a shield (e.g., an inner shield; a primary ferrous shield) in the set of shields 700 redirects the magnetic field of the return path of the array of magnets 100. In another specific example, a shield (e.g., a middle shield) in the set of shields 700 protects leakage flux emanating from another shield. In another specific example, a shield (e.g., an outer shield) functions as an environmental shield, shielding the environment from the self-field of the array of magnets 100. The geometry of one or more shields in the set of shields 700 can optionally be a cylindrical shell. In a specific example, one or more shields in the set of shields 700 can be a cylindrical shell with a cap on each end of the cylindrical shell. In a specific example each cap can include a cutout (e.g., a bore); the shape of the cutout can be: a circle, an ellipse, a rounded rectangle (e.g., squircle), a polyhedron, any oblong shape (e.g., with its dimension in the z-direction greater than its dimension in the x-direction), and/or any other shape. However, the set of shields 700 can be otherwise configured.

Figure 2C:
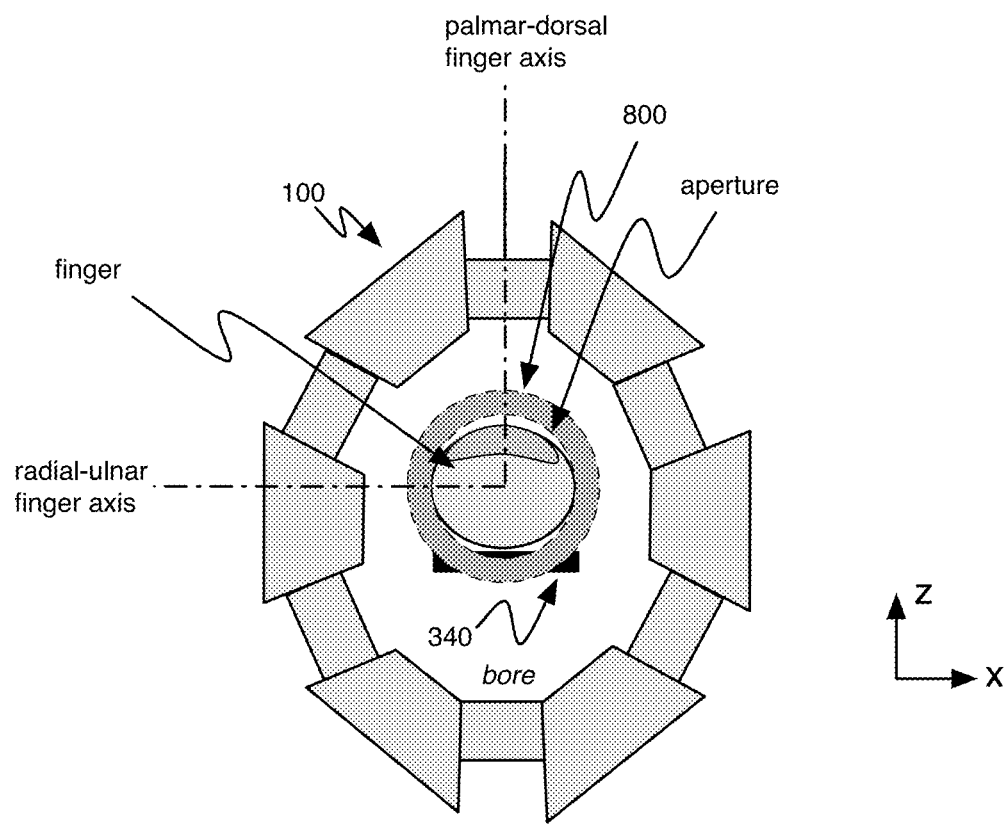
FIGS. 2C and 2D are cross-sectional views of an example of the system, illustrating a sample interface within the bore.
Figure 2D:
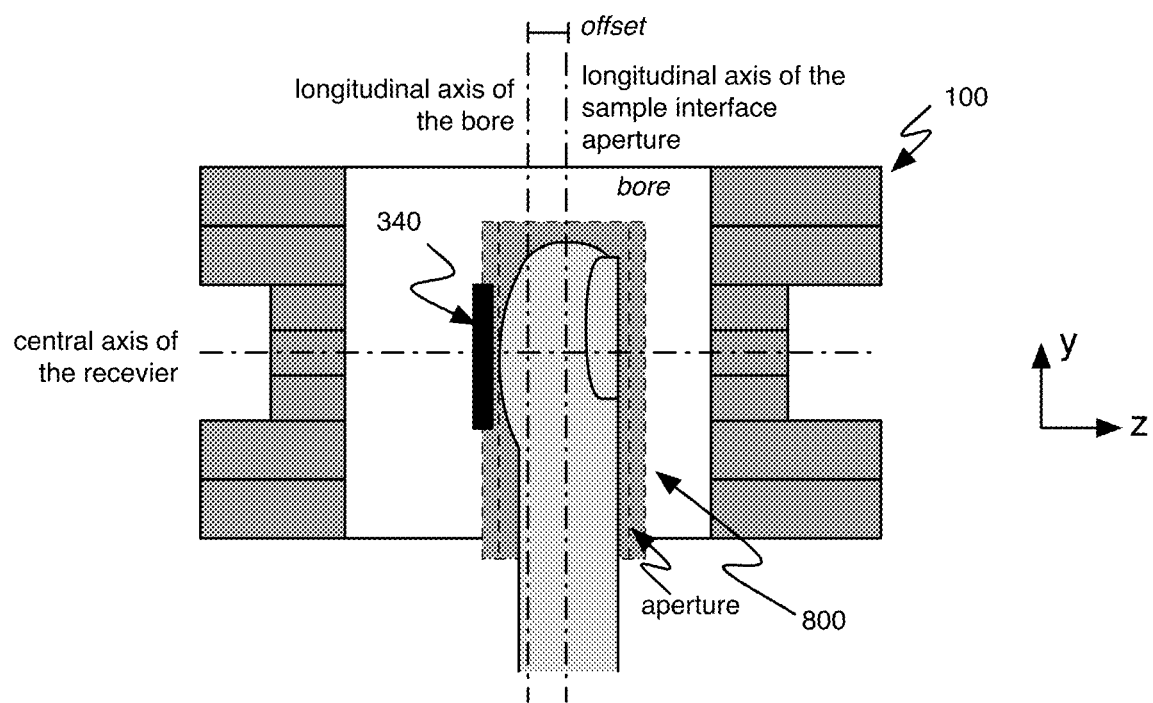
Figure 3:
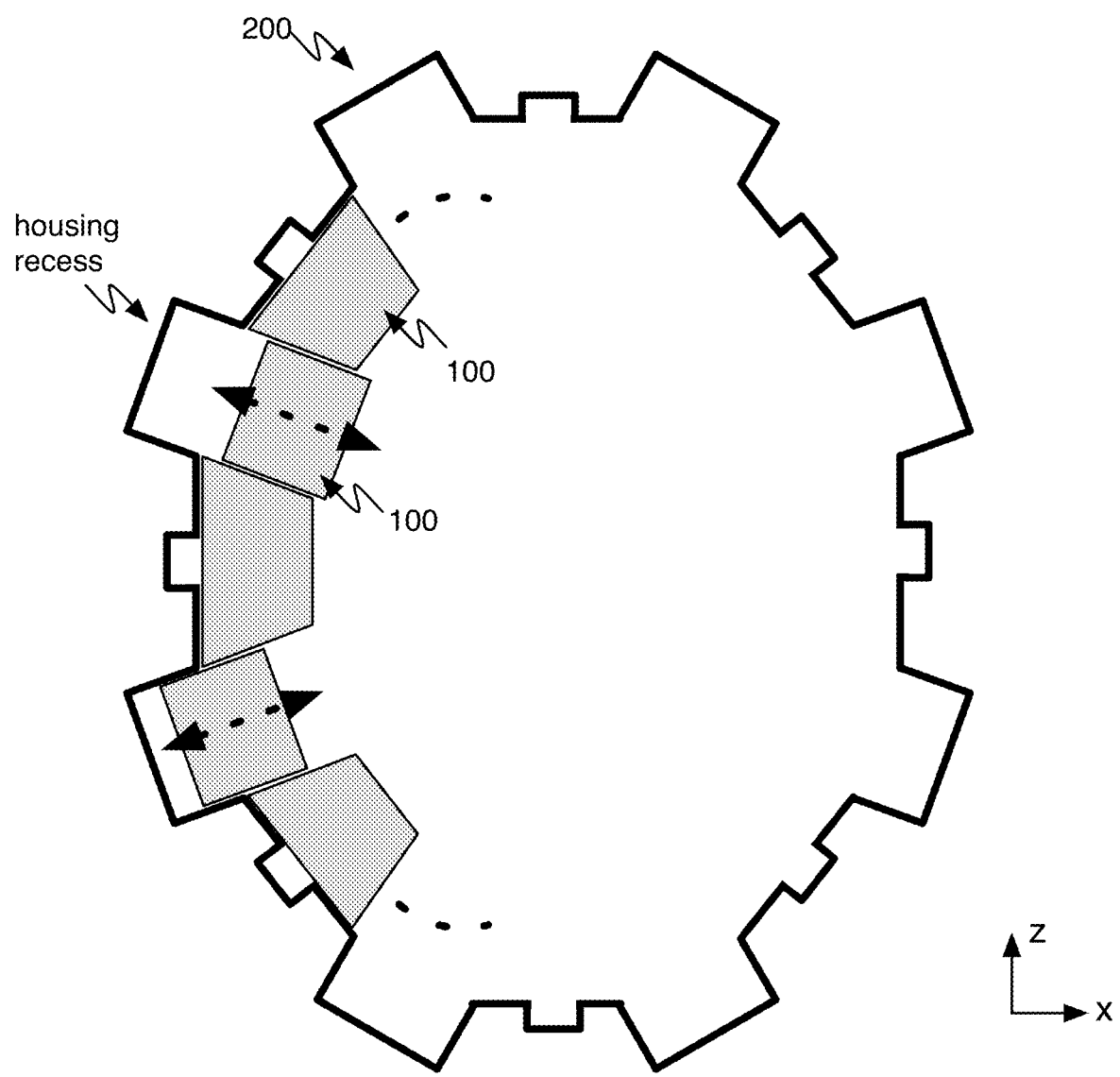
FIG. 3 is a cross-sectional view of an example of magnets within a housing (e.g., a housing segment), wherein the position of a subset magnets can be adjusted.

The system 10 can optionally include a sample interface 800, which functions to: (repeatably) position the sample in the housing 200 (e.g., within the bore) relative to the ROI and/or relative to the receive coil 340, minimize air volume around the sample (e.g., filling volume between the sample and the receive coil 340 with a susceptibility matching material), optimize presence of the analyte of interest in the measurable section of the ROI, reduce signal impact of the user interacting with the device, and/or minimize movement of the sample during the measurement acquisition. Examples are shown in FIG. 2C and FIG. 2D. The sample interface 800 can be part of the housing 200, mounted to the housing 200, separate from the housing 200, and/or otherwise configured. The sample interface 800 is preferably partially or completely mounted within the bore. In a specific example, the sample interface 800 can include the receive coil 340 (e.g., the receive coil 340 is cast inside the sample interface material), interface with the receive coil 340 (e.g., wherein the outer surface of the sample interface 800 includes a negative imprint of the receive coil 340), be mounted to the housing 200 at a predetermined location relative to the receive coil 340, and/or be otherwise associated with the receive coil 340.

The sample interface 800 can optionally include an aperture configured to receive the sample (e.g., a finger). For example, the geometry of the aperture can interface with the sample (e.g., conforming to the sample shape, providing a cap at the end of the aperture to restrict sample movement in the y direction, compressing the sample, etc.). In variants, the geometry of the aperture can facilitate repeatable positioning of the sample within the sample interface 800 and/or can retain the finger in a desired position.

The sample interface 800 can optionally retain the sample such that the receive coil 340 is located at or near a target location on the sample. In an example, for a finger sample, the target location can be between 1 mm-25 mm from the tip of the finger along the length of the finger (e.g., in the negative y-direction), or any range or value therebetween (e.g., 5 mm-15 mm, etc.), but can alternatively be less than 1 mm or greater than 25 mm. In an illustrative example, the target location can be approximately ⅓ of the way down the length of the finger pad. In an example, for a finger sample, the gap (e.g., spacing distance) between the receive coil 340 and the surface of the finger can be between 0 mm-50 mm or any range or value therebetween (e.g., less than 10 mm, less than 5 mm, less than 2 mm, less than 1 mm, etc.), but can alternatively be greater than 50 mm. In a specific example, the sample interface 800 can be configured to position the surface of the pulp of the finger within a threshold distance of the surface coil (e.g., within 10 mm, within 7 mm, within 5 mm, within 2 mm, within 1 mm, etc.). In a specific example, the center of the receive coil 340 is at or near the y-location of the sample target location, and optionally a predetermined gap from the sample target location in the z-direction (e.g., where a 0 mm gap results in the sample touching the receive coil 340). The sample interface 800 can optionally include a cutout for all or a portion of a finger pad (e.g., to enable a decreased gap). The sample interface 520 can optionally include material (e.g., not air) within the gap.

In an example, the sample interface 800 can be arranged within the bore such that a longitudinal axis of the aperture is approximately parallel to the longitudinal axis of the bore (e.g., within 15 degrees, within 10 degrees, within 5 degrees, within 2 degrees, within 1 degree, etc.). The sample interface 800 can optionally be offset within the bore (e.g., offset in the z direction). For example, the sample interface 800 can be positioned within the bore such that the longitudinal axis of the aperture of the sample interface 800 is offset relative to the longitudinal axis of the bore. In an example, the sample interface 800 can be offset such that a target region of the finger (e.g., the pulp of the finger) intersects with the longitudinal axis of the bore when the finger is inserted in the aperture of the sample interface 800. In a specific example, when the finger is positioned within the aperture of the sample interface 800, the pulp of the finger intersects with the longitudinal axis of the bore. In a specific example, the sample interface 800 can be arranged within the bore such that a longitudinal axis of the aperture is approximately parallel to and offset from the longitudinal axis of the bore.

However, the sample interface 800 can be otherwise configured.

However, the system 10 can be otherwise configured.

5. Specific Examples

A numbered list of specific examples of the technology described herein are provided below. A person of skill in the art will recognize that the scope of the technology is not limited to and/or by these specific examples.

Specific Example 1. A system for nuclear magnetic resonance (NMR), comprising: an array of magnets defining a bore configured to receive a finger of a user, the array of magnets arranged arcuately around the bore, wherein a cross-section of the bore is oblong, wherein a width of the array of magnets along a first axis of the bore is less than a height of the array of magnets along a second axis of the bore, the second axis orthogonal to the first axis, wherein the second axis and the first axis are each orthogonal to a longitudinal axis of the bore.

Specific Example 2. The system of Specific Example 1, further comprising a sample interface comprising an aperture configured to position the finger of the user within the bore, wherein the sample interface is arranged within the bore such that a longitudinal axis of the aperture is approximately parallel to and offset from the longitudinal axis of the bore.

Specific Example 3. The system of any of Specific Examples 1-2, wherein the array of magnets comprises multiple stacked magnet array segments, wherein each magnet array segment includes a set of magnets arranged accurately around the bore.

Specific Example 4. The system of Specific Example 3, wherein a magnet array segment at each end of the bore has a larger width along an axis perpendicular to the longitudinal axis of the bore than a magnet array segment at the midpoint of the bore.

Specific Example 5. The system of any of Specific Examples 1-4, wherein a ratio between the height and the width is at least 1.1.

Specific Example 6. The system of any of Specific Examples 1-5, further comprising a shield, wherein the shield comprises a cylindrical shell and a cap on each end of the cylindrical shell, wherein each cap comprises an oblong cutout.

Specific Example 7. The system of any of Specific Examples 1-6, wherein the array of magnets is configured to produce a magnetic field over a region of interest within the bore, wherein the region of interest is nonspherical.

Specific Example 8. The system of any of Specific Examples 1-7, further comprising: a transmit coil; a surface coil; and a processing system configured to perform a scan, wherein performing the scan comprises: using the transmit coil, transmit an electromagnetic pulse sequence; using the surface coil, sample a receive signal; and determine a concentration of a blood analyte in the finger based on the receive signal.

Specific Example 9. The system of Specific Example 8, wherein a central axis of the surface coil intersects with a pulp of the finger during the scan, and wherein the longitudinal axis of the bore intersects with the pulp of the finger during the scan.

Specific Example 10. The system of any of Specific Examples 8-9, wherein the blood analyte comprises glucose.

Specific Example 11. The system of any of Specific Examples 1-10, wherein the array of magnets comprises multiple magnet array segments stacked along a longitudinal axis of the bore, wherein each magnet array segment comprises a first set of magnets from a first shape class and a second set of magnets from a second shape class, the first set of magnets and the second set of magnets arranged in an alternating pattern around the bore.

Specific Example 12. A nuclear magnetic resonance (NMR) system for measuring a concentration of a blood analyte in a finger of a user, the NMR system comprising: an array of magnets arranged around a bore, wherein the array of magnets comprises multiple magnet array segments stacked along a longitudinal axis of the bore, wherein each magnet array segment comprises a first set of magnets from a first shape class and a second set of magnets from a second shape class, the first set of magnets and the second set of magnets arranged in an alternating pattern around the bore.

Specific Example 13. The NMR system of any of Specific Examples 11-12, wherein a cross-section of each magnet array segment is oblong, wherein the cross-section is in a plane orthogonal to the longitudinal axis of the bore.

Specific Example 14. The NMR system of any of Specific Examples 11-13, further comprising a sample interface comprising an aperture configured to receive the finger of the user, wherein the sample interface is positioned within the bore such that a longitudinal axis of the aperture is offset from the longitudinal axis of the bore.

Specific Example 15. The NMR system of Specific Example 14, wherein, when the finger is positioned within the aperture of the sample interface, a pulp of the finger intersects with the longitudinal axis of the bore.

Specific Example 16. The NMR system of any of Specific Examples 11-15, wherein the first shape class comprises a trapezoidal prism shape class, wherein the second shape class comprises a rectangular prism shape class.

Specific Example 17. The NMR system of Specific Example 16, further comprising a housing, wherein the array of magnets is mounted to the housing, wherein the housing comprises recesses over magnets in the array of magnets from the rectangular prism shape class, wherein a subset of the magnets from the rectangular prism shape class are shifted radially outward into the recesses.

Specific Example 18. The NMR system of Specific Example 17, wherein the housing comprises recesses over a midline of magnets in the array of magnets from the trapezoidal prism shape class.

Specific Example 19. The NMR system of any of Specific Examples 11-18, wherein a magnet array segment at each end of the bore has a larger width along an axis perpendicular to the longitudinal axis of the bore than a magnet array segment at the midpoint of the bore.

Specific Example 20. The NMR system of any of Specific Examples 11-19, further comprising: a transmit coil; a surface coil; and a processing system configured to: using the transmit coil, transmit an electromagnetic pulse sequence; using the surface coil, sample a receive signal; and determine the concentration of the blood analyte in the finger based on the receive signal.

Specific Example 21. The NMR system of any of Specific Examples 11-20, wherein the blood analyte comprises glucose.

All references cited herein are incorporated by reference in their entirety, except to the extent that the incorporated material is inconsistent with the express disclosure herein, in which case the language in this disclosure controls.

As used herein, "substantially" or other words of approximation (e.g., "about," "approximately," etc.) can be within a predetermined error threshold or tolerance of a metric, component, or other reference (e.g., within +/−0.001%, +/−0.01%, +/−0.1%, +/−1%, +/−2%, +/−5%, +/−10%, +/−15%, +/−20%, +/−30%, any range or value therein, of a reference).

Optional elements, which can be included in some variants but not others, are indicated in broken line in the figures.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUS, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A system for nuclear magnetic resonance (NMR), comprising:
   an array of magnets defining a bore configured to receive a finger of a user, the array of magnets arranged arcuately around the bore, wherein a cross-section of the bore is oblong, wherein a width of the array of magnets along a first axis of the bore is less than a height of the array of magnets along a second axis of the bore, the second axis orthogonal to the first axis, wherein the second axis and the first axis are each orthogonal to a longitudinal axis of the bore, wherein the array of magnets comprises multiple stacked magnet array segments, wherein each magnet array segment comprises a first set of magnets from a trapezoidal prism shape class and a second set of magnets from a rectangular prism shape class.

2. The system of claim 1, further comprising a sample interface comprising an aperture configured to position the finger of the user within the bore, wherein the sample interface is arranged within the bore such that a longitudinal axis of the aperture is approximately parallel to and offset from the longitudinal axis of the bore.

3. The system of claim 1, wherein the array of magnets comprises multiple stacked magnet array segments, wherein each magnet array segment includes a set of magnets arranged accurately around the bore.

4. The system of claim 3, wherein a magnet array segment at each end of the bore has a larger width along an axis perpendicular to the longitudinal axis of the bore than a magnet array segment at the midpoint of the bore.

5. The system of claim 1, wherein a ratio between the height and the width is at least 1.1.

6. The system of claim 1, further comprising a shield, wherein the shield comprises a cylindrical shell and a cap on each end of the cylindrical shell, wherein each cap comprises an oblong cutout.

7. The system of claim 1, wherein the array of magnets is configured to produce a magnetic field over a region of interest within the bore, wherein the region of interest is nonspherical.

8. The system of claim 1, further comprising:
a transmit coil;
a surface coil; and
a processing system configured to perform a scan, wherein performing the scan comprises:
using the transmit coil, transmit an electromagnetic pulse sequence;
using the surface coil, sample a receive signal; and
determine a concentration of a blood analyte in the finger based on the receive signal.

9. The system of claim 8, wherein a central axis of the surface coil intersects with a pulp of the finger during the scan, and wherein the longitudinal axis of the bore intersects with the pulp of the finger during the scan.

10. The system of claim 8, wherein the blood analyte comprises glucose.

11. The system of claim 1, further comprising a housing, wherein the array of magnets is mounted to the housing, wherein the housing comprises recesses over magnets in the array of magnets from the rectangular prism shape class, wherein a subset of the magnets from the rectangular prism shape class are shifted radially outward into the recesses.

12. The system of claim 11, wherein the housing further comprises recesses over a midline of magnets in the array of magnets from the trapezoidal prism shape class.

* * * * *